United States Patent
Nomura et al.

(10) Patent No.: US 7,639,274 B2
(45) Date of Patent: Dec. 29, 2009

(54) IMAGE FORMING APPARATUS WITH EXPOSURE UNITS USING OSCILLATION MIRRORS AND METHOD FOR CONTROLLING DRIVE FREQUENCIES OF THE OSCILLATION MIRRORS

(75) Inventors: Yujiro Nomura, Nagano-ken (JP); Ken Ikuma, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 818 days.

(21) Appl. No.: 11/104,289

(22) Filed: Apr. 12, 2005

(65) Prior Publication Data

US 2005/0259143 A1 Nov. 24, 2005

(30) Foreign Application Priority Data

Apr. 20, 2004 (JP) ............................. 2004-124573
Apr. 20, 2004 (JP) ............................. 2004-124574

(51) Int. Cl.
*B41J 15/14* (2006.01)
*B41J 27/00* (2006.01)

(52) U.S. Cl. ...................................... 347/243; 347/259

(58) Field of Classification Search ................. 347/231, 347/243, 259, 260; 359/204
See application file for complete search history.

(56) References Cited

U.S. PATENT DOCUMENTS

| 6,956,597 B2 * | 10/2005 | Bush et al. ................... 347/243 |
| 7,233,343 B2 * | 6/2007 | Turner et al. ................. 347/243 |
| 2002/0122217 A1 | 9/2002 | Nakajima |
| 2003/0072066 A1 | 4/2003 | Hayashi et al. |
| 2003/0227538 A1 | 12/2003 | Fujii et al. |
| 2004/0036936 A1 * | 2/2004 | Nakajima et al. ........... 359/204 |

FOREIGN PATENT DOCUMENTS

| JP | 01-302317 | 12/1989 |
| JP | 09197334 A | 7/1997 |
| JP | 09240060 A | 9/1997 |
| JP | 2001013417 A | 1/2001 |
| JP | 2004-053943 | 2/2004 |
| JP | 2004-191416 | 7/2004 |
| JP | 2005-031238 | 2/2005 |

OTHER PUBLICATIONS

European Search Report for corresponding European application No. 05008545.5-2217 lists the reference above.

* cited by examiner

*Primary Examiner*—Hai C Pham
(74) *Attorney, Agent, or Firm*—Hogan & Hartson LLP

(57) ABSTRACT

In an image forming apparatus including plural exposure units each deflecting a light beam from a light source by means of an oscillation mirror in resonant oscillations and scanning the deflected light beam on a latent image carrier thereby forming a latent image on the latent image carrier, every one of the exposure units assuredly attains an adequate amplitude of the oscillation mirror for ensuring the formation of images of high quality. More specifically, a CPU 101 retrieves resonant frequencies of individual deflectors previously stored in a memory. The CPU 101 calculates an average value of these resonant frequencies and applies a drive command to mirror drivers 1022 of the exposure units 6Y, 6M, 6C, 6K such as to drive all the deflectors into oscillations at the average value. Alternatively, a resonant-frequency adjusting section 653 makes adjustment to match the resonant frequencies of the individual deflectors substantially with a drive frequency. This ensures that all the oscillation mirrors attain adequate amplitudes.

8 Claims, 15 Drawing Sheets

IMAGE FORMING APPARATUS WITH EXPOSURE UNITS USING OSCILLATION MIRRORS AND METHOD FOR CONTROLLING DRIVE FREQUENCIES OF THE OSCILLATION MIRRORS

CROSS REFERENCE TO RELATED APPLICATION

The disclosure of Japanese Patent Applications enumerated below including specification, drawings and claims is incorporated herein by reference in its entirety:
No. 2004-124573 filed Apr. 20, 2004; and
No. 2004-124574 filed Apr. 20, 2004.

BACKGROUND OF THE INVENTION

1. Field of the Invention

The present invention relates to an image forming apparatus of a so-called tandem system and a method thereof. Particularly, the invention relates to an apparatus wherein exposure units are each provided in correspondence to each latent image carrier, the exposure unit using, as a deflector, an oscillation mirror in resonant oscillations for optical scanning.

2. Description of the Related Art

As the image forming apparatus of this type, a so-called tandem image forming apparatus has conventionally been known wherein photosensitive members, exposure units and developing units are each dedicated to each of mutually different four color components including, for example, yellow, magenta, cyan and black. In this tandem apparatus, an image of each color component is formed on the photosensitive member in the following manner. A light source of one exposure unit for one color component is controlled based on image data indicative of an image of the color component, while a light beam from the light source is scanned by means of the deflector of the exposure unit thereby forming, on the photosensitive member, a latent image corresponding to the image data related to the color component. Subsequently, the resultant latent images are developed with toners of mutually different colors to form toner images of plural colors. Then, the toner images of the plural colors are superimposed on each other on a transfer medium to form a color image thereon.

Aiming at downsizing and speeding up the deflector, it has heretofore been proposed to employ a resonant oscillation mirror as the deflector, the oscillation mirror disclosed in, for example, Japanese Unexamined Patent Publication No. 1-302317, page 2 and FIG. 2 to FIG. 4. In this apparatus, the oscillation mirror is driven into resonant oscillations by matching a frequency of a drive signal applied to the oscillation mirror with a natural resonant frequency of the oscillation mirror, whereby a relatively great amplitude is attained. The light beam from the light source is guided to the oscillation mirror in resonant oscillations so as to scan the light beam.

SUMMARY OF THE INVENTION

In a case where the resonant oscillation mirror is used as the deflector of the tandem apparatus, the following problem may be encountered. Specifically, the tandem apparatus requires four exposure units, some or all of which may encounter discrepancy between the resonant frequency and the drive frequency due to an external factor of use environment or individual specificities of the oscillation mirrors, thus resulting in a significant decrease of the oscillation amplitude of the oscillation mirror. As a result, the individual exposure units fail to form desired latent images and hence, the resultant image is lowered in quality.

It is a primary object of the invention to provide an image forming apparatus including a plurality of exposure units each operative to deflect the light beam from the light source by means of the oscillation mirror in resonant oscillations and to scan the deflected light beam on the latent image carrier thereby forming a latent image on the latent image carrier, the apparatus adapted to ensure that all the exposure units assuredly attain the adequate amplitudes of the oscillation mirrors so as to form images of high quality.

According to a first aspect of the present invention, there is provided an image forming apparatus comprising: a plurality of latent image carriers; a plurality of exposure units each provided in correspondence to the respective latent image carriers, each of the exposure units including a light source and an oscillation mirror, and forming a latent image on the latent image carrier by deflecting a light beam from the light source into a deflected light beam by means of the oscillation mirror in oscillations and scanning the deflected light beam on the latent image carrier; a drive unit which applies a drive signal having one drive frequency to each oscillation mirror to drive the oscillation mirror at the drive frequency; and a controller which controls the drive unit, wherein the drive unit is arranged to be capable of varying the drive frequency of the drive signal, and wherein the controller determines an optimum value of the drive frequency based on each resonant frequency of the oscillation mirrors and controls the drive unit in a manner to match the drive frequency of the drive signal substantially with the optimum value.

According to a second aspect of the present invention, there is provided an image forming method comprising: a preparing step of preparing a plurality of latent image carriers each formed with a latent image on its surface; a latent image forming step of deflecting a light beam from a light source by means of an oscillation mirror oscillating at a predetermined drive frequency and scanning the deflected light beam on each latent image carrier; a developing step of developing the latent images with different color toners, respectively, thereby forming a plurality of toner images having different colors each other; a transferring step of superimposing the different color toner images on a transfer medium thereby forming a color image; and an adjusting step, performed prior to the latent image forming step, of determining an optimum value of the drive frequency based on each resonant frequency of the oscillation mirrors so that each oscillation mirror starts oscillation at the optimum value.

According to a third aspect of the present invention, there is provided an image forming apparatus comprising: a plurality of latent image carriers; a plurality of exposure units each provided in correspondence to the respective latent image carriers, each of the exposure units including a light source and a oscillation mirror, and forming a latent image on the latent image carrier by deflecting a light beam from the light source into a deflected light beam by means of the oscillation mirror in oscillations and scanning the deflected light beam on the latent image carrier; a drive unit which applies a drive signal having a predetermined drive frequency to each oscillation mirror to drive the oscillation mirror; an adjusting unit which adjusts resonant frequencies of the oscillation mirrors, respectively; and a controller which controls the adjusting unit in a manner to match all the resonant frequencies of the oscillation mirrors substantially with the drive frequency.

According to a fourth aspect of the present invention, there is provided an image forming method comprising: a preparing step of preparing a plurality of latent image carriers each formed with latent image on its surface; a latent image forming step of deflecting a light beam from a light source by means of an oscillation mirror oscillating at a predetermined drive frequency and scanning the deflected light beam on each latent image carrier; a developing step of developing the latent images with different color toners to form a plurality of different color toner images; a transferring step of superimposing the different color toner images on a transfer medium thereby forming a color image; and an adjusting step, performed prior to the latent image forming step, of adjusting resonant frequencies of the oscillation mirrors in a manner to match all the resonant frequencies of the oscillation mirrors substantially with the drive frequency.

The above and further objects and novel features of the invention will more fully appear from the following detailed description when the same is read in connection with the accompanying drawing. It is to be expressly understood, however, that the drawing is for purpose of illustration only and is not intended as a definition of the limits of the invention.

DETAILED DESCRIPTION OF THE PREFERRED EMBODIMENTS

First Embodiment

Figure 1:
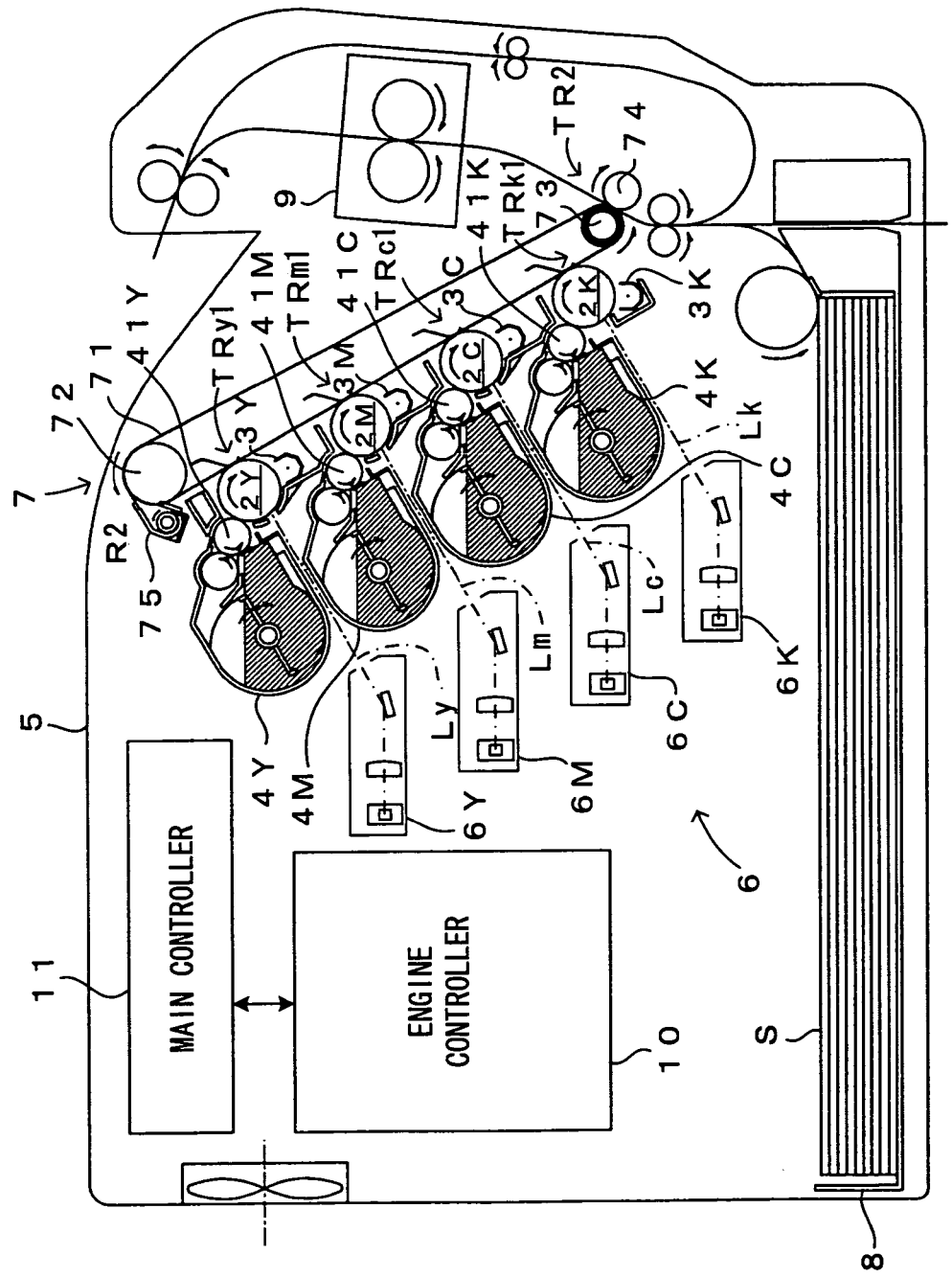
FIG. 1 is diagram showing a preferred embodiment of an image forming apparatus according to the present invention.
Figure 2:
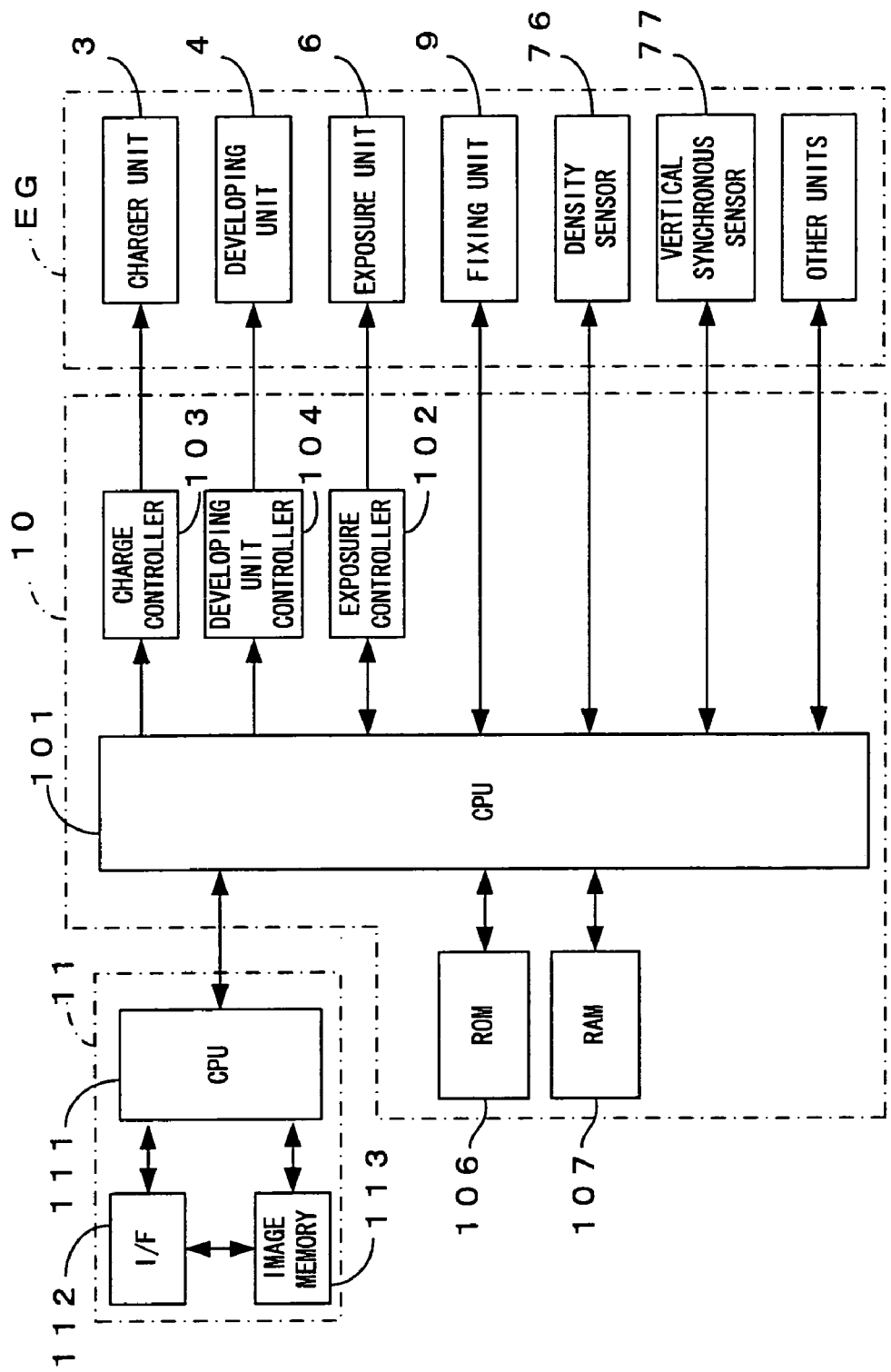
FIG. 2 is a block diagram showing an electrical arrangement of the image forming apparatus of FIG. 1.

FIG. 1 is a diagram showing an image forming apparatus according to a first embodiment of the invention. FIG. 2 is a block diagram showing an electrical arrangement of the image forming apparatus of FIG. 1. This image forming apparatus is a so-called tandem color printer wherein photosensitive members 2Y, 2M, 2C, 2K for four colors of yellow Y, magenta M, cyan C and black K, as latent image carriers, are juxtaposed in an apparatus body 5. The apparatus is adapted to form a full-color image by superimposing toner images on the individual photosensitive members 2Y, 2M, 2C, 2K, or to form a monochromatic image using only the toner image of black (k). The image forming apparatus operates as follows. When an external apparatus such as a host computer applies a print command to a main controller 11 in response to a request from a user wanting to form an image, a CPU 111 of the main controller 11 sends a print command, based on which an engine controller 10 controls individual parts of an engine EG so as to form the image corresponding to the print command on a sheet S such as copy sheet, transfer sheet, paper and transparent sheet for OHP.

In the engine EG, charger units, developing units, exposure units and cleaners are provided in correspondence to the four photosensitive members 2Y, 2M, 2C, 2K, respectively. It is noted that these charger units, developing units, exposure units and cleaners for the respective color components are arranged the same ways. Therefore, the arrangement for the yellow color component is described here while individual parts of the arrangements for the other color components are represented by equivalent reference characters, respectively, and the description thereof is dispensed with.

Figure 4:
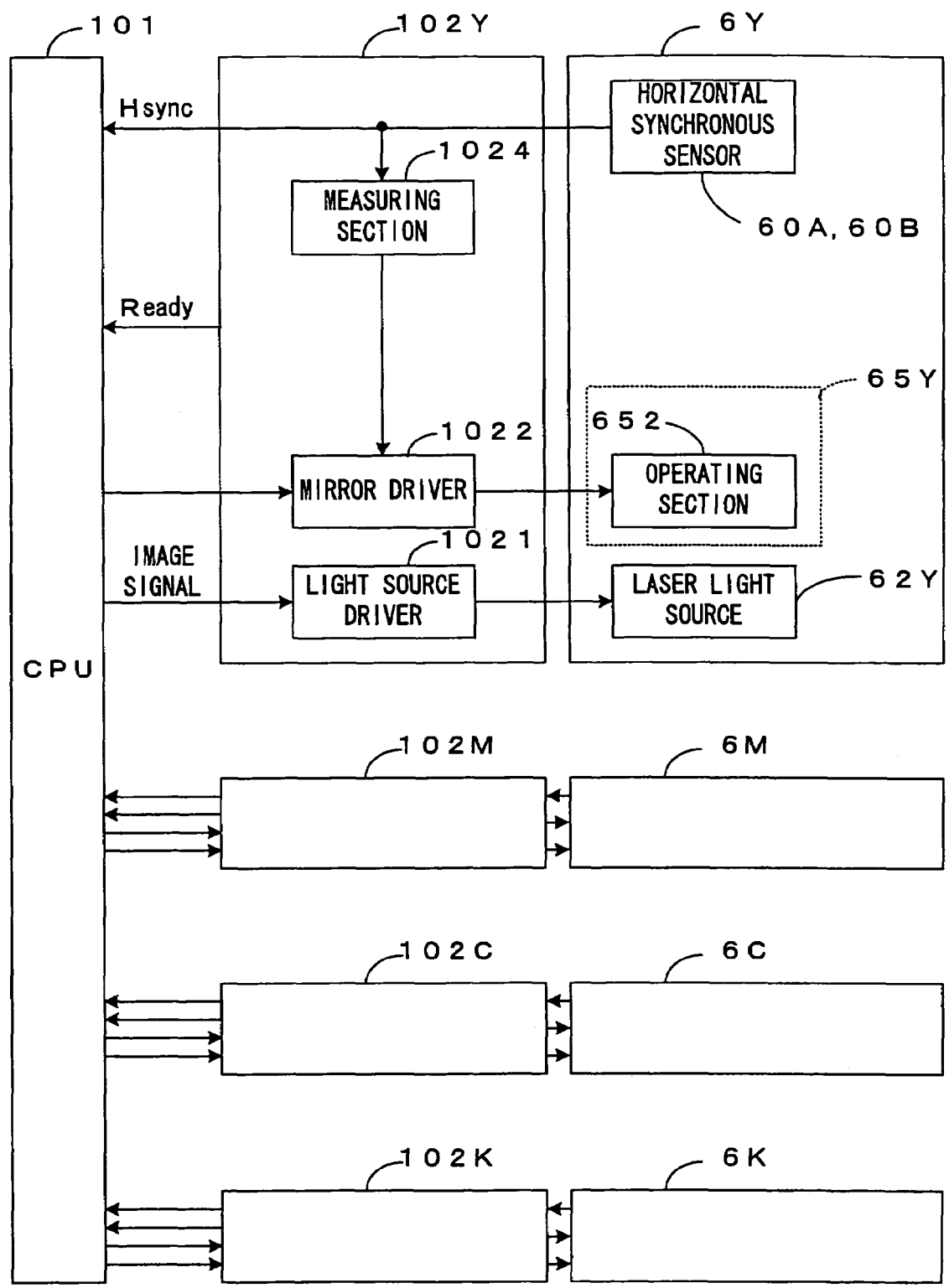
FIG. 4 is a block diagram showing an arrangement of the exposure unit and the exposure controller in the image forming apparatus of FIG. 1.

The photosensitive member 2Y is arranged to be rotatable in a direction of an arrow shown in FIG. 1. The charger unit 3Y, the developing unit 4Y and the cleaner (not shown) are arranged around the photosensitive member 2Y along the rotational direction. The charger unit 3Y comprises a scorotron charger, for example, which is applied with a charging bias from a charge controller 103 thereby uniformly charging an outside surface of the photosensitive member 2Y to a predetermined surface potential. The exposure unit 6Y emits a light beam Ly toward the outside surface of the photosensitive member 2Y so charged by the charger unit 3Y. Thus, an electrostatic latent image corresponding to yellow-image data included in the print command is formed on the photosensitive member 2Y. The exposure unit 6Y operates based on a control command from an exposure controller 102Y (FIG. 4). Arrangements and operations of the exposure unit 6 and the exposure controller 102 will be described in details hereinlater.

The electrostatic latent image thus formed is developed with toner by means of the developing unit 4Y. The developing unit 4Y contains therein a yellow toner. When a developing unit controller 104 applies a developing bias to a developing roller 41Y, the toner carried on the developing roller 41Y is made to locally adhere to surface portions of the photosensitive member 2Y according to the surface potentials thereof. As a result, the electrostatic latent image on the photosensitive member 2Y is visualized as a yellow toner image. A DC voltage or a DC voltage superimposed with an AC voltage may be used as the developing bias to be applied to the developing roller 41Y. Particularly in an image forming apparatus of a non-contact development system wherein the photosensitive member 2Y is spaced away from the developing roller 41Y and the toner is made to jump between these members for accomplishing the development with toner, the developing bias may preferably have a waveform formed by superimposing a sinusoidal, triangular-wave or rectangular-wave AC voltage on the DC voltage for the purpose of efficient toner jumps.

The yellow toner image developed by the developing unit 4Y is primarily transferred onto an intermediate transfer belt 71 of a transfer unit 7 in a primary transfer region TRy1. The other members for the other color components than yellow are arranged absolutely the same way as those for yellow. A magenta toner image, a cyan toner image and a black toner image are formed on the respective photosensitive members 2M, 2C, 2K and are primarily transferred onto the intermediate transfer belt 71 in respective primary transfer regions TRm1, TRc1, TRk1.

The transfer unit 7 includes: the intermediate transfer belt 71 entrained about two rollers 72, 73; and a belt driver (not shown) operative to drive the roller 72 into rotation thereby rotating the intermediate transfer belt 71 in a predetermined rotational direction R2. The transfer unit is further provided with a secondary transfer roller 74 which confront the roller 73 with the intermediate transfer belt 71 interposed therebetween and which is adapted to be moved into contact with or away from a surface of the belt 71 by means of an unillustrated electromagnetic clutch. In a case where a color image is transferred to the sheet S, primary transfer timings are controlled to superimpose the individual toner images on each other thereby to form the color image on the intermediate transfer belt 71. Then, the color image is secondarily transferred onto the sheet S taken out from a cassette 8 and delivered to a secondary transfer region TR2 between the intermediate transfer belt 71 and the secondary transfer roller 74. In a case where a monochromatic image is transferred onto the sheet S, on the other hand, only a black toner image is formed on the photosensitive member 2k and the monochromatic image is secondarily transferred onto the sheet S delivered to the secondary transfer region TR2. The sheet S thus secondarily transferred with the image is transported to a discharge tray at a top surface of the apparatus body via a fixing unit 9.

After the primary transfer of the toner images to the intermediate transfer belt 71, the photosensitive members 2Y, 2M, 2C, 2K have their the surface potentials reset by unillustrated static eliminators. In addition, the photosensitive members are removed of the toners remaining on their surfaces by means of the cleaners. Then, the photosensitive members are subjected to the subsequent charging by means of the charger units 3Y, 3M, 3C, 3K.

Disposed in the vicinity of the roller 72 are a transfer belt cleaner 75, a density sensor 76 (FIG. 2) and a vertical synchronous sensor 77 (FIG. 2). Of these, the cleaner 75 is adapted to be moved into contact with or away from the roller 72 by means of an unillustrated electromagnetic clutch. As moved to the roller 72, the cleaner 75 holds its blade against the surface of the intermediate transfer belt 71 entrained about the roller 72 thereby removing the toner remaining on the outside surface of the intermediate transfer belt 71 after the secondary image transfer. The density sensor 76 confronts the surface of the intermediate transfer belt 71 for sensing optical densities of patch images formed on the outside surface of the intermediate transfer belt 71. The vertical synchronous sensor 77 is a sensor for detecting a reference position of the intermediate transfer belt 71. The sensor functions as a vertical synchronous sensor for outputting a synchronous signal or a vertical synchronous signal Vsync in association with a drivable rotation of the intermediate transfer belt 71 in a sub-scan direction. In this apparatus, operation timings of the individual parts are synchronized while the operations of the individual parts of the apparatus are controlled based on the vertical synchronous signal Vsync such as to superimpose the toner images of the respective colors on each other precisely.

In FIG. 2, a reference numeral 113 represents an image memory provided in the main controller 11 for storing image data supplied from the external apparatus such as the host computer via an interface 112. A reference numeral 106 represents a ROM for storing operation programs executed by a CPU 101, control data used for controlling the engine EG, resonant frequencies of deflectors to be described hereinlater, and the like. A reference numeral 107 represents a RAM for temporarily storing the operation results given by the CPU 101, and other data.

Figure 3:
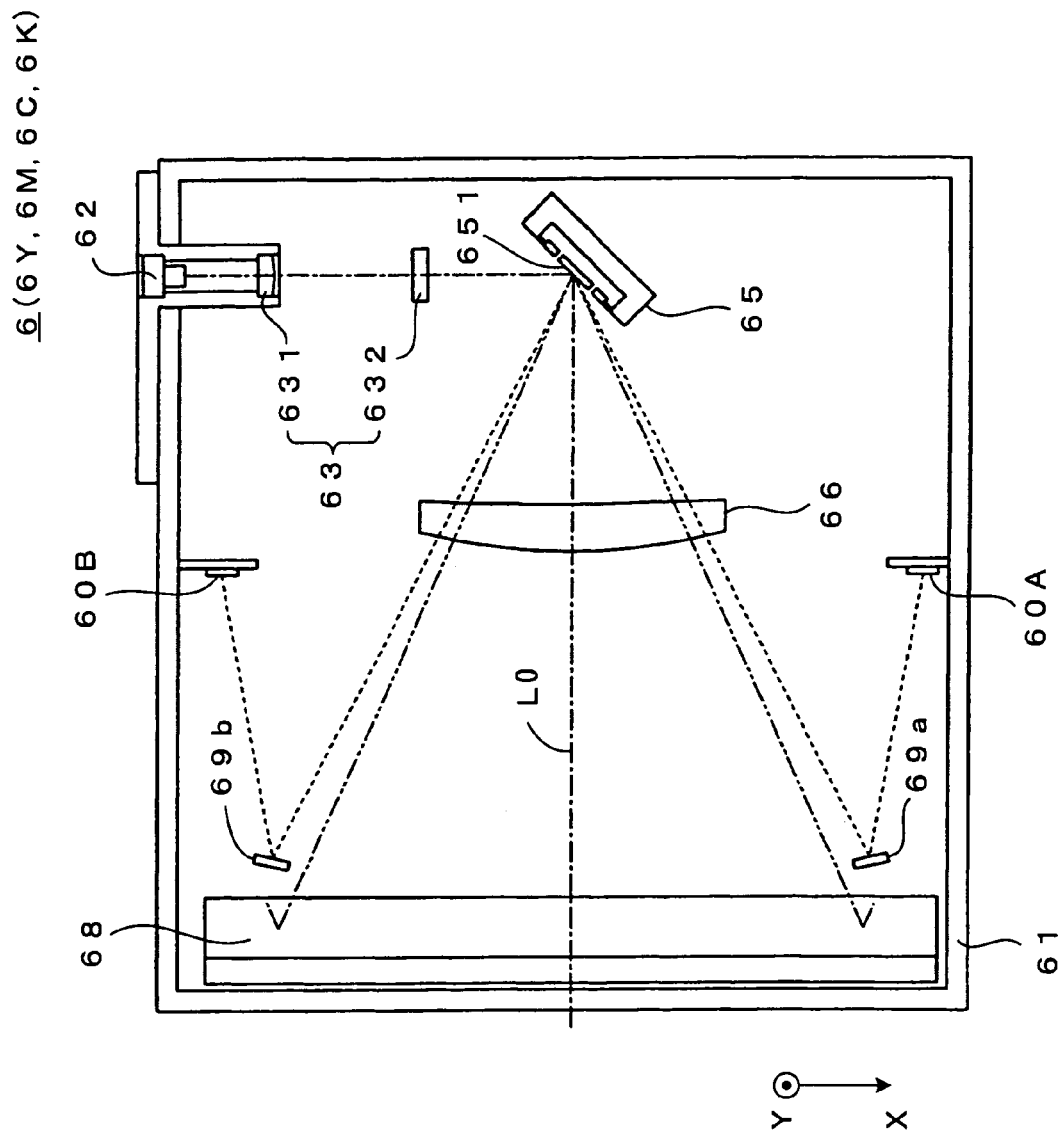
FIG. 3 is a sectional view taken on a main-scan direction for showing an arrangement of the exposure unit provided in the image forming apparatus of FIG. 1.

FIG. 3 is a sectional view taken on a main-scan direction for showing an arrangement of the exposure unit provided in the image forming apparatus of FIG. 1. FIG. 4 is a block diagram showing arrangements of the exposure unit and the exposure controller in the image forming apparatus of FIG. 1. Referring to these figures, the arrangements and operations of the exposure unit 6 and the exposure controller 102 are described as below. The exposure unit 6 and the exposure controller 102 for the respective color components are arranged the same ways. Therefore, the arrangement for the yellow color component is described here while the individual parts of the arrangements for the other color components are represented by equivalent reference characters, respectively, and the description thereof is dispensed with.

The exposure unit 6Y (6M, 6C, 6K) includes an exposure casing 61. The exposure casing 61 has a single exposure light source 62Y fixed thereto so as to be capable of emitting the light beam from the laser light source 62Y. As shown in FIG. 4, the laser light source 62Y is electrically connected with a light source driver 1021 of the exposure controller 102Y. Thus, the light source driver 1021 provides ON/OFF control of the laser light source 62Y according to an image signal, so that the laser light source 62Y emits the light beam modulated in correspondence to the image data.

Within the exposure casing 61, there are provided a collimator lens 631, a cylindrical lens 632, a deflector 65Y and a scanning lens 66 for scanning the light beam from the laser light source 62Y on the surface of the photosensitive member 2Y. Specifically, the light beam from the laser light source 62Y is shaped into a collimated beam of a suitable size by means of the collimator lens 631 and then, is made incident on the cylindrical lens 632 powered only in a sub-scan direction Y. By adjusting the cylindrical lens 631, the collimated beam is focused onto place near a deflective mirror 651 of the deflector 65Y with respect to the sub-scan direction Y. According to the embodiment, a combination of the collimator lens 631 and the cylindrical lens 632 functions as a beam shaping system 63 for shaping the light beam from the laser light source 62Y.

The deflector 65Y is formed using a micromachining technique which applies a semiconductor fabrication technique in integrally forming micro machines on a semiconductor substrate. The deflector comprises an oscillation mirror adapted for resonant oscillations. Specifically, the deflector 65Y is capable of deflecting the light beam in a main-scan direction X by means of the deflective mirror 651 in resonant oscillations. More specifically, the deflective mirror 651 is carried in a manner to be oscillatble about an oscillatory axis (torsion spring) extending substantially perpendicular to the main-scan direction. The deflective mirror oscillates about the oscillatory axis according to an external force applied from an operating section 652. The operating section 652 applies an electrostatic, electromagnetic or mechanical external force to the deflective mirror 651 based on a mirror drive signal from a mirror driver 1022 of the exposure controller 102Y, thereby causing the deflective mirror 651 to oscillate at a frequency of the mirror drive signal. The operating section 652 may adopt any of the drive methods based on electrostatic attraction, electromagnetic force and mechanical force. These drive methods are known in the art and hence, the description thereof is dispensed with.

The mirror driver 1022 can be reprogrammed to change drive conditions including the frequency, voltage and the like of the mirror drive signal. As will be described hereinlater, the mirror driver can be reprogrammed to change the frequency of the mirror drive signal to an optimum value determined from the resonant frequencies of the deflectors 65Y, 65M, 65C, 65K. The mirror driver is also adapted to adjust an amplitude value by changing the voltage of the mirror drive signal.

The light beam deflected by the deflective mirror 651 of the deflector 65Y is directed toward the scanning lens 66. According to the embodiment, the scanning lens 66 is arranged to have a substantially constant F-value with respect to the overall effective scan region on the surface of the photosensitive member 2. Therefore, the light beam deflected to the scanning lens 66 passes therethrough to be focused onto the effective scan region on the photosensitive member 2Y in a spot of a substantially constant diameter. Thus, the light beam is scanned in parallel to the main-scan direction X so as to form, on the photosensitive member 2, a linear latent image extending in the main-scan direction X.

In this embodiment, reflective mirrors 69a, 69b are employed for guiding a start end or a terminal end of a scan path of the scanned light beam to horizontal synchronous sensors 60a, 60B, as shown in FIG. 3. These reflective mirrors 69a, 69b and the horizontal synchronous sensors 60A, 60B are disposed outside of a sweep surface formed by sweeping the light beam during the scanning on the effective scan region. Furthermore, the reflective mirrors 69a, 69b are disposed substantially symmetrically with respect to an optical axis of the light beam scanned substantially on the center of the effective scan region. Therefore, the horizontal synchronous sensors 60A, 60B may be commensurately considered to be disposed substantially symmetrically with respect to the optical axis.

Scan-beam detection signals from these horizontal synchronous sensors 60A, 60B are transmitted to a measuring section 1024 of the exposure controller 102Y so that the measuring section calculates a scan time during which the light beam is scanned on the effective scan region. The scan time calculated by the measuring section 1024 is transmitted to the mirror driver 1022, so that the mirror driver 1022 can reprogram the drive conditions of the mirror drive signal according to the scan time thus supplied, the drive conditions under which the deflective mirror 651 is driven. Further according to the embodiment, the horizontal synchronous sensors 60A, 60B also function as horizontal synchronous read sensors for providing a synchronous signal or horizontal synchronous signal Hsync for causing the light beam to be scanned on the effective scan region in the main-scan direction X.

In the apparatus of the aforementioned arrangement, a start-up process is performed at power-on or prior to the start of printing in order to make adjustment to ensure that the light beam may preferably be scanned by the deflector 65 (65Y, 65M, 65C, 65K). More specifically, the following start-up process is performed.

Figure 5:
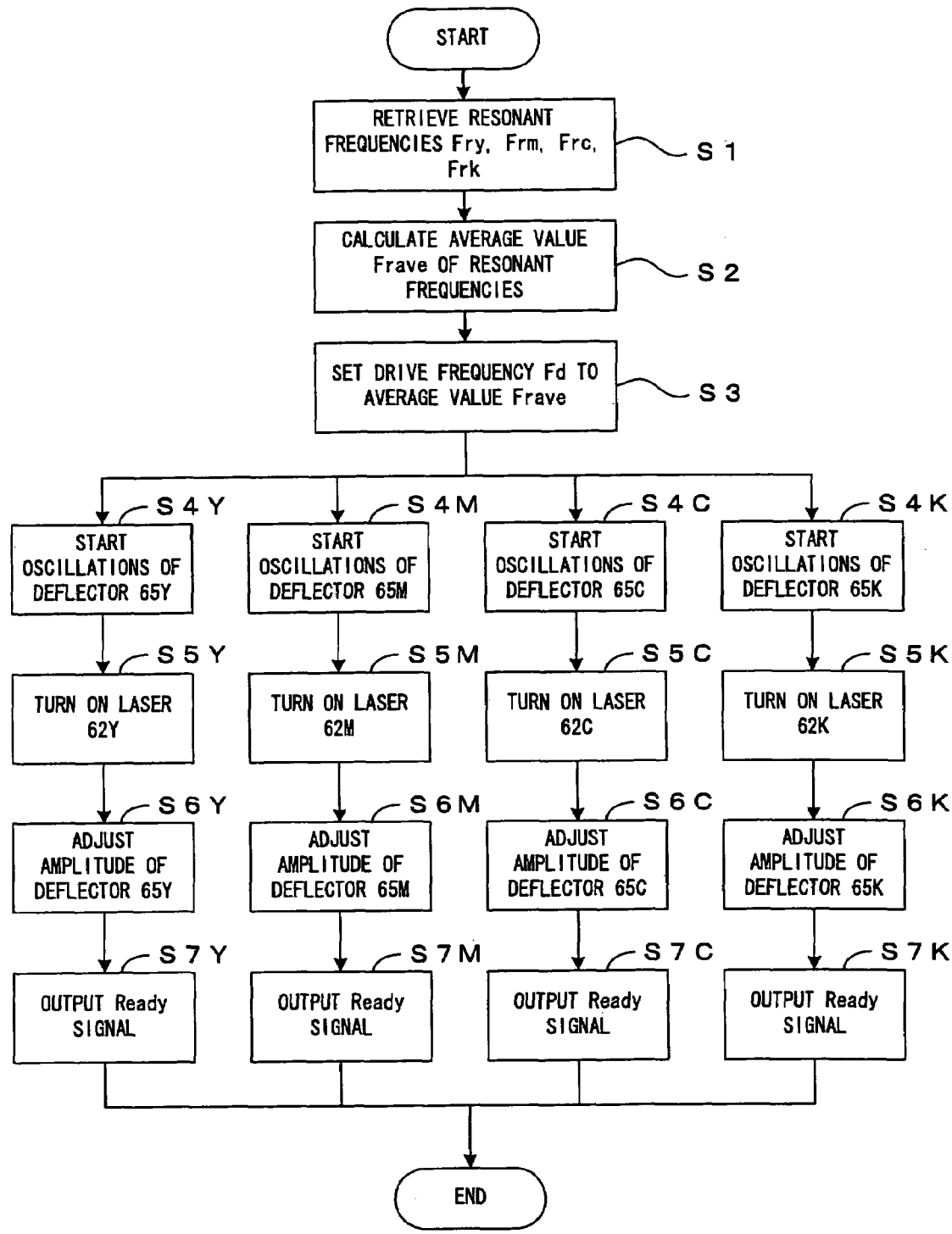
FIG. 5 is a flow chart showing the start-up process performed by the image forming apparatus of FIG. 1
Figure 6:
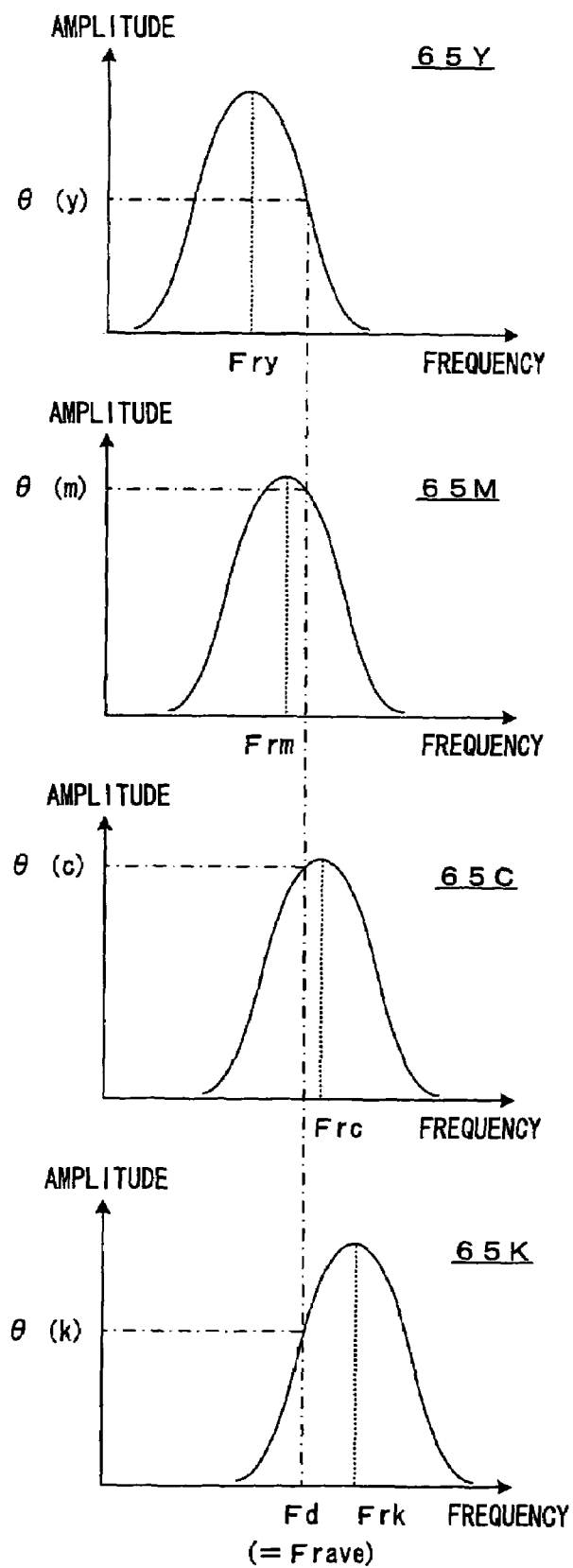
FIG. 6 is a group of diagrams schematically showing the start-up process shown in FIG. 5.

FIG. 5 is a flow chart showing the start-up process performed by the image forming apparatus of FIG. 1. FIG. 6 is a group of diagrams schematically showing the start-up process shown in FIG. 5. In this start-up process, the CPU 101 retrieves resonant frequencies Fry, Frm, Frc, Frk of the deflectors 65Y, 65M, 65C, 65K previously stored in the ROM 106 (Step S1). According to the embodiment, the ROM 106 functions as a "storage unit" of the invention, but the unit to store the resonant frequencies Fry, Frm, Frc, Frk is not limited to this. In an alternative arrangement, for example, each of the exposure controllers 102Y, 102M, 102C, 102k may be provided with a memory in which the resonant frequency may be stored.

Next, the CPU 101 calculates an average value Frave of the resonant frequencies Fry, Frm, Frc, Frk as an "optimum value" of the invention (Step S2). The CPU applies a drive command to the respective mirror drivers 1022 of the exposure units 6Y, 6M, 6C, 6K such that all the deflectors 65Y, 65M, 65C, 65K may oscillate at the average value Frave. Receiving this drive command, the mirror driver 1022 sets the frequency of the drive signal or a drive frequency Fd to the average value Frave (Step S3) and drives the deflectors 65Y, 65M, 65C, 65K into oscillations simultaneously.

In the exposure unit 6Y for yellow, the deflective mirror 651 of the deflector 65Y oscillates at the drive frequency Fd in response to the mirror drive signal having the drive frequency Fd (=Frave) (Step S4Y). After the lapse of a predetermined period of time from the start of oscillations of the deflector 65Y, the light source driver 1021 outputs a light-source drive signal to the laser light source 62Y so as to turn on the laser light source 62Y (Step S5Y). At this time, the deflector 65 is already in oscillations. Hence, the light beam is scanned on the surface of the photosensitive member 2Y so as to be prevented from being intensively irradiated on a part of the photosensitive member 2Y. In synchronism with the scanning of the light beam, the horizontal synchronous sensors 60A, 60B output the horizontal synchronous signal Hsync. In the subsequent Step S6Y, the drive voltage of the mirror drive signal applied from the mirror driver 1022 to the deflector 65 is controlled based on the sensor outputs so as to adjust the amplitude value of the deflector 65Y, whereby the speed of the light beam Ly is adjusted. This ensures that the light beam Ly is scanned stably. When the stabilization of the scan speed is completed, the laser light source 62 is turned off. In step S7Y, the exposure controller outputs a Ready signal to the CPU 101 to complete the start-up process for the yellow exposure unit 6Y.

The same process as the above is performed on the other toner colors than yellow. Specifically, a series of processings (Steps S4M to S7M) are performed on the magenta color to bring the deflector 65M into oscillation at the drive frequency Fd (=Frave), to adjust the speed of a light beam Lm and thereafter, to output the Ready signal to the CPU 101 to complete the start-up process for the magenta exposure unit 6M. On the other hand, a series of processings (Steps S4C to S7C) are performed on the cyan color to bring the deflector 65C into oscillation at the drive frequency Fd (=Frave), to adjust the speed of a light beam Lc and thereafter, to output the Ready signal to the CPU 101 to complete the start-up process for the cyan exposure unit 6C. Furthermore, a series of processings (Steps S4K to S7K) are performed on the black color to bring the deflector 65K into oscillation at the drive frequency Fd (=Frave), to adjust the speed of a light beam Lk and thereafter, to output the Ready signal to the CPU 101 to complete the start-up process for the black exposure unit 6K. In this manner, this embodiment carries out the start-up processes on all the toner colors in parallel. Receiving the Ready signals for all the toner colors at completion of the start-up processes on all the toner colors, the CPU 101 performs a color print process according to a color print command.

As described above, the embodiment is arranged such that even though the resonant frequencies Fry, Frm, Frc, Frk of the deflectors 65Y, 65M, 65C, 65K for the individual toner colors are different from one another as shown in FIG. 6, for example, the deflectors are driven at the average value Frave of these frequencies. Hence, the amount of deviation of the drive frequency Fd (Frave) from each of the resonant frequencies Fry, Frm, Frc, Frk is decreased. In all the exposure units 6Y, 6M, 6C, 6K, therefore, the deflective mirrors 651 of the deflectors 65 may be driven into the resonant oscillations at the same drive frequency Fd. In addition, each of the deflective mirrors 651 may have an adequate amplitude. This results in the formation of images of high quality.

Figure 7:
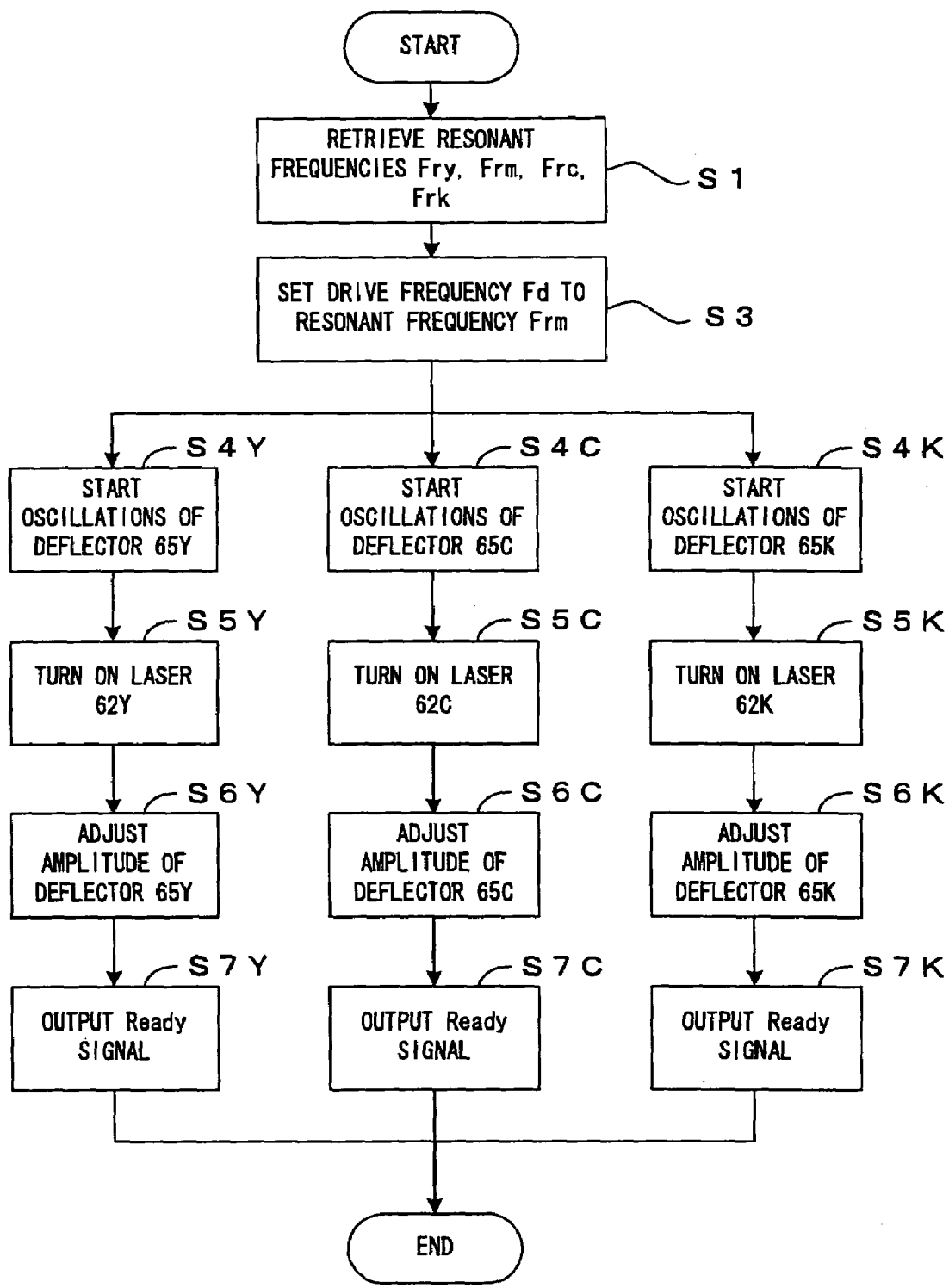
FIG. 7 is a flow chart showing the second embodiment of the image forming apparatus according to the invention.
Figure 8:
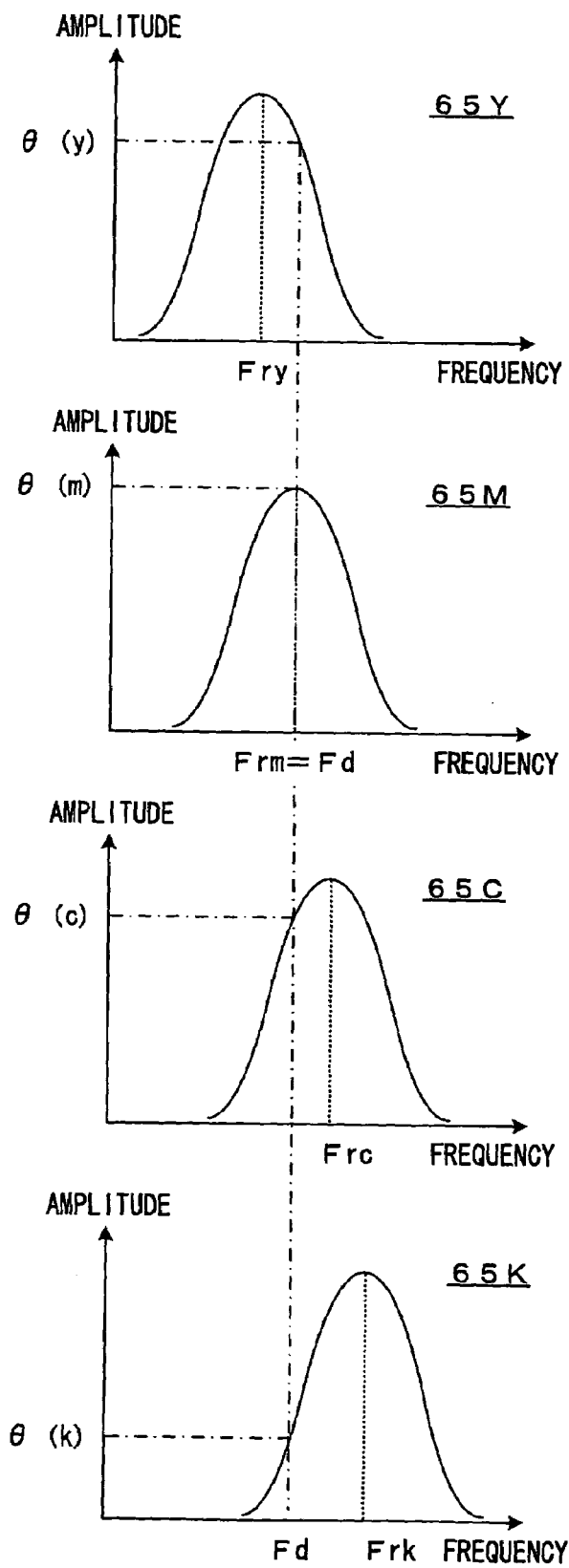
FIG. 8 is a group of diagrams schematically showing the operations of the second embodiment.

In the foregoing embodiment, the average value Frave of the resonant frequencies Fry, Frm, Frc, Frk is defined as the "optimum value" of the invention as shown in FIG. 6, so that the drive frequency Fd is set to the average value Frave. Alternatively, a frequency range between the maximum value and the minimum value (inclusive) of these resonant frequencies Fry, Frm, Frc, Frk may be defined as an adjustment range, within which the optimum value of the drive frequency may be decided. In a case where the resonant frequencies Fry, Frm, Frc, Frk have the following magnitude relation Fry<Frm<Frc<Frk, for example, as shown in FIG. 6, the maximum value is the resonant frequency Frk, whereas the minimum value is the resonant frequency Fry. Hence, any value within the adjustment range (Fry-Frk) such as a median thereof may be defined as the optimum value:

Median=(Fry+Frk)/2. Alternatively, a weighted average may be defined as the "optimum value". While one of the resonant frequencies Fry, Frm, Frc, Frk may also be defined as the "optimum value", it is preferred to select the closest value to the median (Second Embodiment). Referring to FIG. 7 and FIG. 8, a second embodiment is described as below.

Second Embodiment

FIG. 7 is a flow chart showing the second embodiment of the image forming apparatus according to the invention. FIG. 8 is a group of diagrams schematically showing the operations of the second embodiment. In this embodiment, the resonant frequencies Fry, Frm, Frc, Frk of the deflectors 65Y, 65M, 65C, 65K stored in the ROM 106 are retrieved (Step S1). Out of these resonant frequencies Fry, Frm, Frc, Frk, the resonant frequency Frm of the magenta deflector 65M, which is the closest to the median, is selected as the "optimum value" of the invention. The drive frequency Fd is set to the resonant frequency Frm (Step S3) and the deflectors 65Y, 65M, 65C, 65K are driven into oscillations simultaneously. It is noted here that the magenta deflector attains the adequate amplitude because the drive frequency Fd coincides with the resonant frequency Frm thereof.

In the exposure unit 6Y, 6C, 6K for the other toner colors than magenta, on the other hand, the same process as that of the first embodiment is performed. Specifically, a series of processings (Steps S4Y to S7Y) are performed on the yellow color to drive the deflector 65Y into oscillations at the drive frequency Fd (=Frm), to adjust the speed of the light beam Ly and thereafter, to output the Ready signal to the CPU 101 to complete the start-up process for the yellow exposure unit 6Y. Further, a series of processings (Steps S4C to S7C) are performed on the cyan color to drive the deflector 65C into oscillations at the drive frequency Fd (=Frave), to adjust the speed of the light beam Lc and thereafter, to output the Ready signal to the CPU 101 to complete the start-up process for the cyan exposure unit 6C. Furthermore, a series of processings (Steps S4K to S7K) are performed on the black color to drive the deflector 65K into oscillations at the drive frequency Fd (=Frave), to adjust the speed of the light beam Lk and thereafter, to output the Ready signal to the CPU 101 to complete the start-up process for the black exposure unit 6K. In this manner, this embodiment carries out the start-up processes on all the toner colors in parallel. Receiving the Ready signals for all the toner colors at completion of the start-up processes on all the toner colors, the CPU 101 performs the color print process according to the color print command.

As described above, the second embodiment also permits, likewise to the first embodiment, all the exposure units 6Y, 6M, 6C, 6K to drive the deflective mirrors 651 of the deflectors 65 into the resonant oscillations at the same drive frequency Fd as well as to attain the adequate amplitudes of the respective deflective mirrors 651. This results in the formation of images of high quality. Furthermore, the drive frequency Fd coincides with the resonant frequency Frm of the magenta deflector 65M and hence, what is to be done is to subject the deflectors for the remaining three colors to the adjustment of the light beam speed based on the amplitude adjustment. Thus, the start-up process may be performed efficiently.

Although the second embodiment sets the drive frequency Fd to the resonant frequency Frm of the magenta deflector 65M, it goes without saying that the drive frequency may be set to the resonant frequency of the deflector 65 for any other toner color.

Third Embodiment

Figure 9:
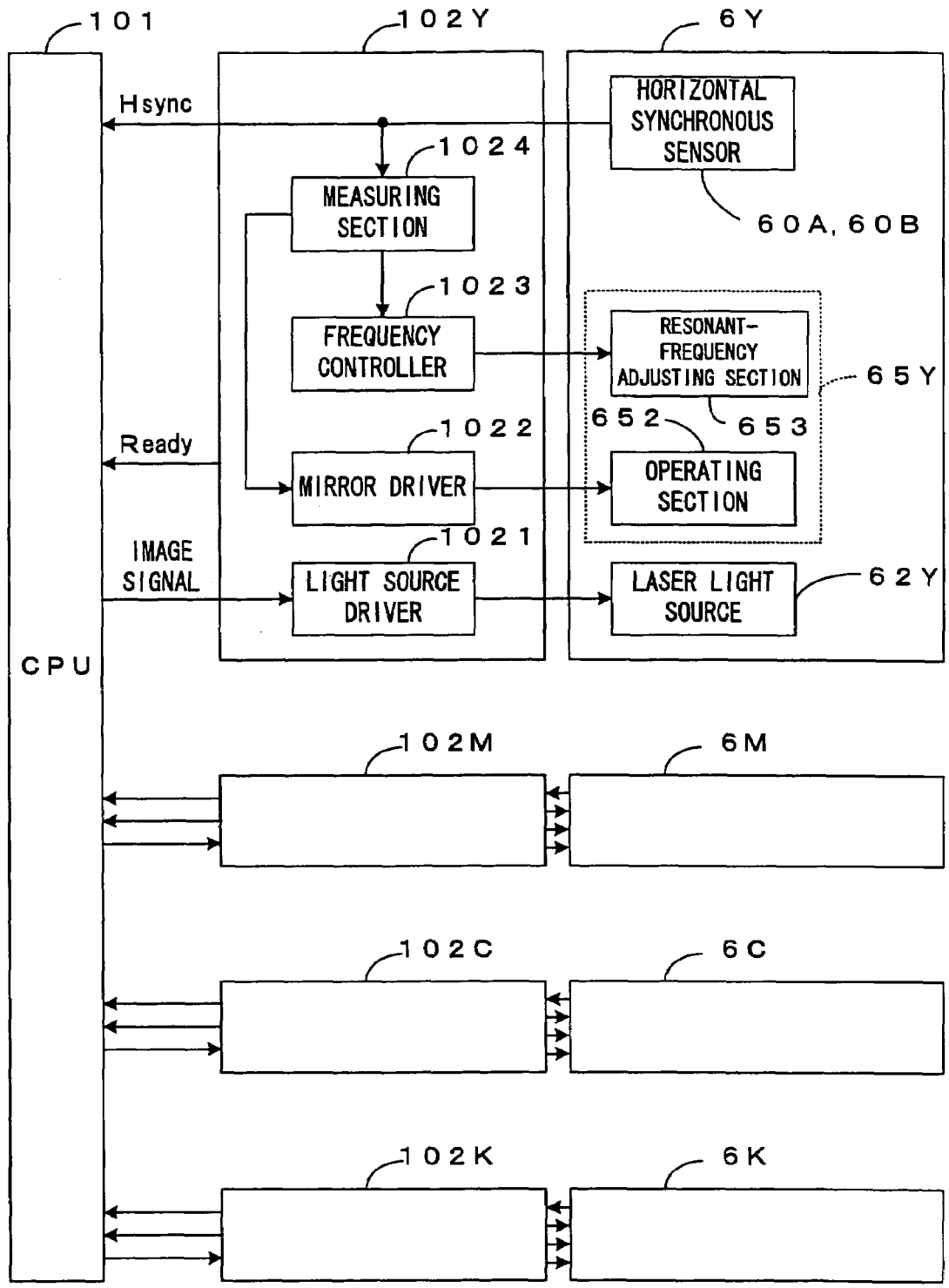
FIG. 9 is a block diagram showing an arrangement of a third embodiment of the exposure unit and the exposure controller of the image forming apparatus of FIG. 1.

FIG. 9 is a block diagram showing an arrangement of a third embodiment of the exposure unit and the exposure controller of the image forming apparatus of FIG. 1. Referring to this figure and the sectional view taken on the main-scan direction for showing the arrangement of the exposure unit (FIG. 3), the arrangements and operations of the exposure unit 6 and of the exposure controller 102 are described in details. The exposure unit 6 and the exposure controller 102 for the respective color components are arranged the same ways. Therefore, the arrangement for the yellow color is described here while the individual parts of the arrangements for the other color components are represented by equivalent reference characters, respectively, and the description thereof is dispensed with.

In the third embodiment, the deflector 65Y is provided with a resonant-frequency adjusting section 653 as disclosed in Japanese Unexamined Patent Publication No. 9-197334, for example. Thus, the embodiment is adapted to vary the resonant frequency of the deflector 65. Specifically, this resonant-frequency adjusting section 653 includes an electrical resistance element formed at the torsion spring (not shown) of the deflector 65. The electrical resistance element is electrically connected with a frequency controller 1023 of the exposure controller 102Y. The frequency controller 1023 controls power supply to the electrical resistance element so as to vary the temperature of the torsion spring. Thus is varied the spring constant of the torsion spring so that the resonant frequency of the deflector 65 can be varied. In a case where the resonant frequency does not coincide with the frequency (drive frequency) of the mirror drive signal, as will be described hereinlater, the embodiment operates the resonant-frequency adjusting section 653 to vary the resonant frequency of the deflector 65 for substantially matching the resonant frequency with the drive frequency. It is noted that a specific arrangement for varying the resonant frequency of the deflector 65 is not limited to this, and any conventionally known arrangement may be adopted.

According to the third embodiment, the scan time during which the light beam is scanned on the effective scan region is transmitted to the frequency controller 1023, the scan time calculated by the measuring section 1024 based on the scan-beam detection signals from the aforesaid horizontal synchronous sensors 60A, 60B. In response to the scan time, the frequency controller 1023 adjusts the resonant frequency of the deflector 65. The scan time is also transmitted to the mirror driver 1022. The mirror driver 1022 can be reprogrammed to change the drive conditions of the mirror drive signal according to the scan time so transmitted, the mirror drive signal used for driving the deflective mirror 651. In this embodiment, as well, the horizontal synchronous sensors 60A, 60B also function as the horizontal synchronous read sensors for providing the synchronous signal or the horizontal synchronous signal Hsync for causing the light beam to be scanned on the effective scan region in the main-scan direction X.

When the apparatus of the aforementioned arrangement receives a print command in a state where the deflector 65 (65Y, 65M, 65C, 65K) is out of oscillations, the apparatus performs a start-up process before starting a printing operation such as to make adjustment for ensuring that the light beam may preferably be scanned by means of the deflector 65. More specifically, the following start-up process is performed.

Figure 10:
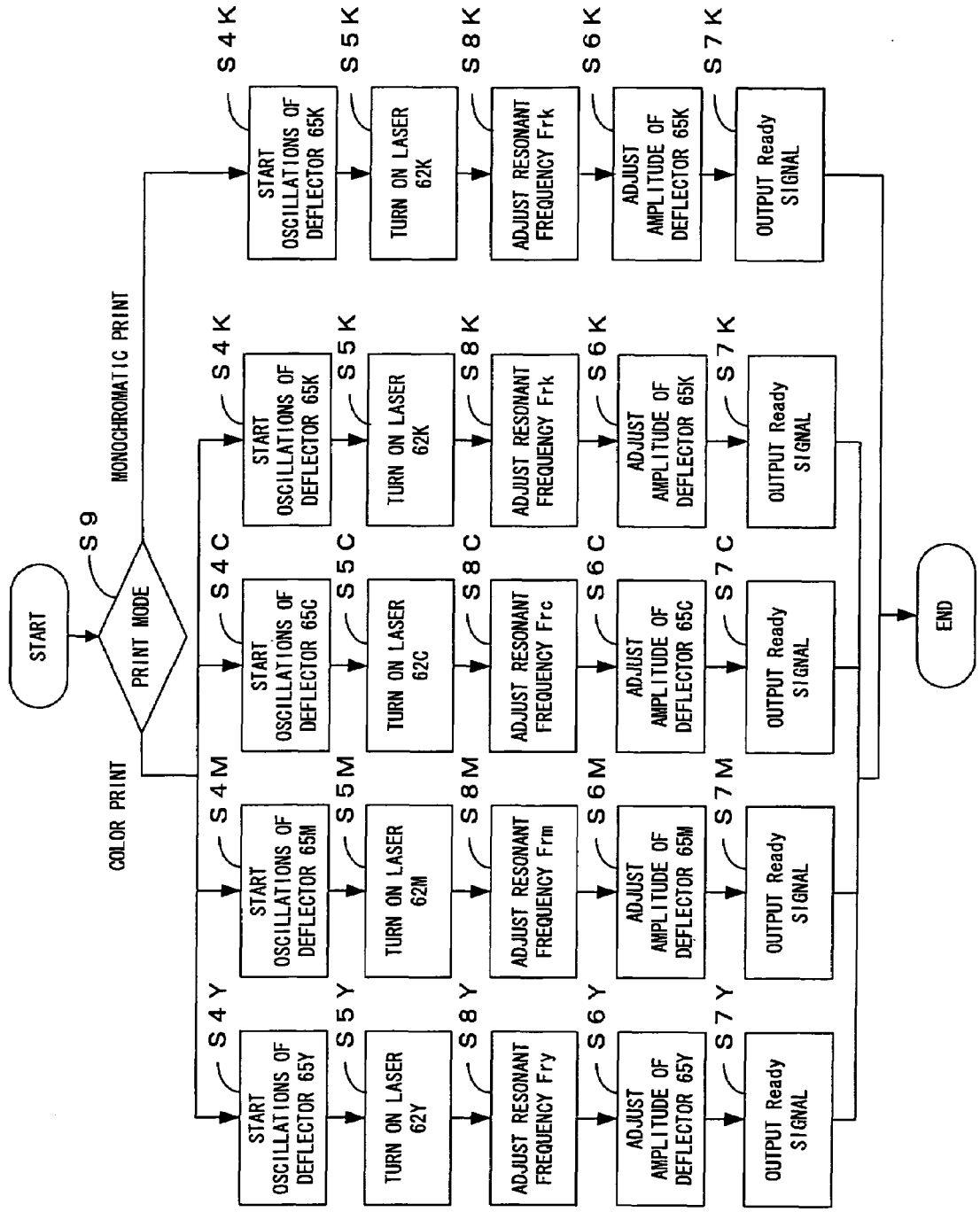
FIG. 10 is a flow chart showing the third embodiment of the image forming apparatus according to the invention.
Figure 11:
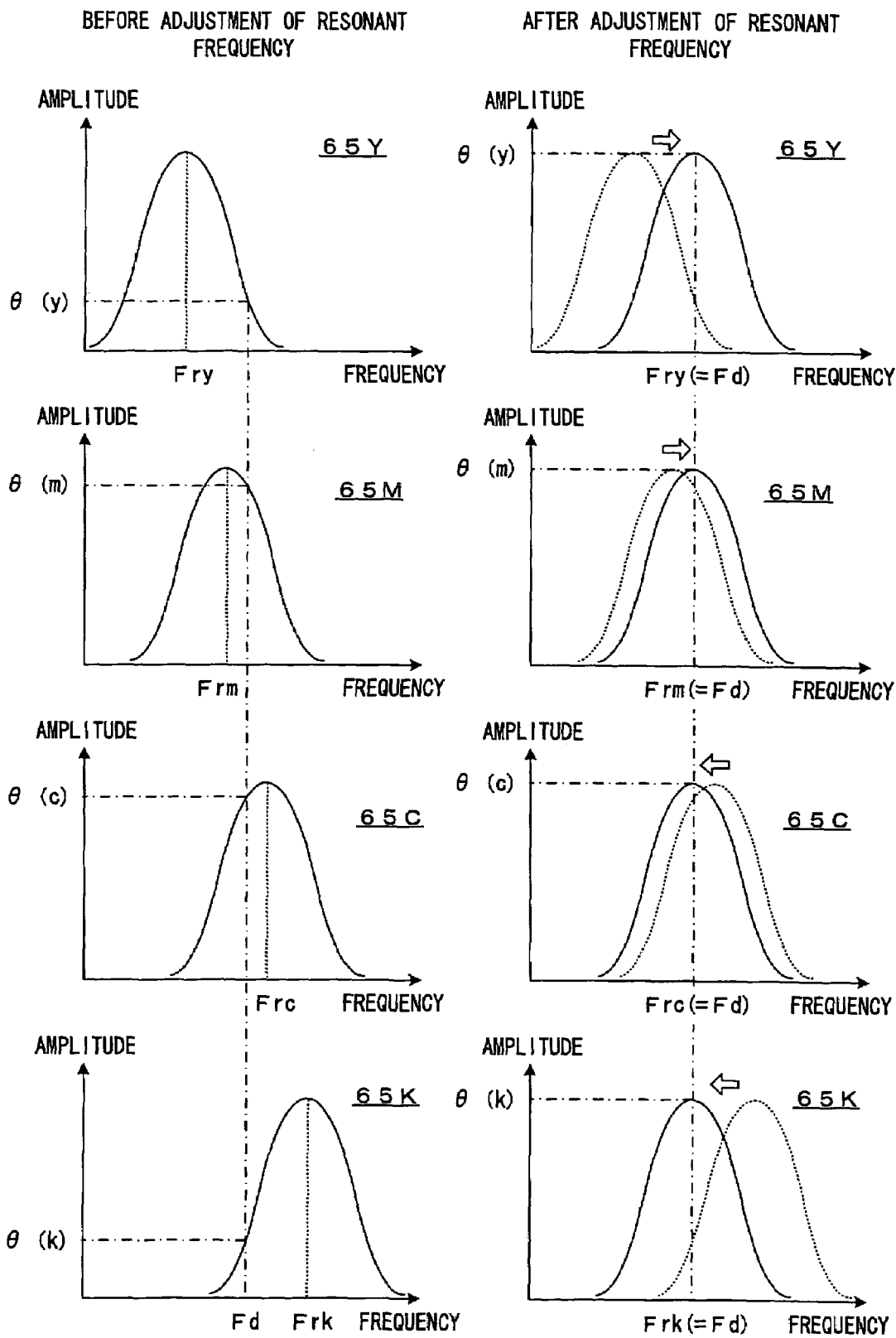
FIGS. 11A and 11B are groups of diagram schematically showing adjustment processes for the deflector in a color print mode shown in FIG. 10.

FIG. 10 is a flow chart showing the third embodiment of the image forming apparatus according to the invention. FIGS. 11A and 11B are groups of diagrams schematically showing adjustment processes for the deflector 65 which are performed prior to color printing in a color print mode shown in FIG. 10. In the start-up process, whether the print command indicates the color print mode or a monochromatic print mode is determined in Step S9. In the case of the color print mode, the adjustment process for the deflector 65 is performed on all the toner colors.

As shown in FIG. 10, a series of processings (Steps S4Y, S5Y, S8Y, S6Y, S7Y) are performed on the yellow color in this adjustment process. Specifically, in the yellow exposure unit 6Y, a mirror drive signal having a predetermined drive frequency Fd is applied from the mirror driver 1022 to the deflector 65Y prior to turn-on of the laser light source 62Y, thereby driving the deflective mirror 651 of the deflector 65Y into oscillations (Step S4Y). Thus, the deflective mirror 651 oscillates at the frequency Fd, as shown in FIG. 11A, for example. In a case where the resonant frequency Fry of the deflector 65Y is deviated from the drive frequency Fd, an amplitude θ(y) of the deflective mirror 651 is significantly decreased from the maximum amplitude. Hence, Step S5Y and Step S8Y are performed for substantially matching the resonant frequency Fry with the drive frequency Fd, thereby adjusting the amplitude θ(y) to the maximum amplitude. Specifically, after the lapse of a predetermined period of time from the start of oscillations of the deflector 65Y, the light source driver 1021 outputs the light-source drive signal to the laser light source 62Y so as to turn on the laser light source 62Y (Step S5Y). At this time, the deflector 65 is already in oscillations. Hence, the light beam is scanned on the surface of the photosensitive member 2Y so as to be prevented from being intensively irradiated on a part of the photosensitive member 2Y. In synchronism with the scanning of the light beam, the horizontal synchronous sensors 60A, 60B output the horizontal synchronous signal Hsync. In the subsequent Step S8Y, the frequency controller 1023 controls the power supply to the electrical resistance element based on the sensor outputs so as to vary the temperature of the torsion spring of the deflector 65Y, whereby a (pre-adjustment) resonant characteristic of the deflector 65Y, as indicated by a broken line in FIG. 11B, is shifted to the drive frequency side. This brings the resonant frequency Fry of the deflector 65Y substantially into coincidence with the drive frequency Fd, so that the amplitude θ(y) is at the maximum value.

After the adjustment of the resonant frequency Fry, the drive voltage of the mirror drive signal applied from the mirror driver 1022 to the deflector 65 is controlled based on the sensor outputs so as to adjust the maximum amplitude of the deflector 65Y, whereby the speed of the light beam Ly is adjusted (Step S6Y). This ensures that the light beam Ly is scanned stably. When the stabilization of the scan speed is completed, the laser light source 62 is turned off. In step S7Y, the exposure controller outputs the Ready signal to the CPU 101 to complete the start-up process for the yellow exposure unit 6Y.

The same process as the above is performed on the other toner colors than yellow. Specifically, a series of processings (Steps S4M, S5M, S8M, S6M, S7M) are performed on the magenta color to match the resonant frequency Frm of the deflector 65M substantially with the drive frequency Fd, to adjust the speed of the light beam Lm (=Frave) and thereafter, to output the Ready signal to the CPU 101 to complete the start-up process for the magenta exposure unit 6M. Further, a series of processings (Steps S4C, S5C, S8C, S6C, S7C) are performed on the cyan color to match the resonant frequency Frc of the deflector 65C substantially with the drive frequency Fd, to adjust the speed of the light beam Lc and thereafter, to output the Ready signal to the CPU 101 to complete the start-up process for the cyan exposure unit 6C. Furthermore, a series of processings (Steps S4K, S5K, S8K, S6K, S7K) are performed on the black color to match the resonant frequency Frk of the deflector 65K substantially with the drive frequency Fd, to adjust the speed of the light beam Lk and thereafter, to output the Ready signal to the CPU 101 to complete the start-up process for the black exposure unit 6K. Receiving the Ready signals for all the toner colors at completion of the start-up processes on all the toner colors, the CPU 101 performs the color print process according to the color print command.

On the other hand, in a case where Step S9 determines the print command to indicate the monochromatic print, a series of processings (Steps S4K, S5K, S8K, S6K, S7K) are performed only on the black color to match the resonant frequency Frk of the deflector 65K substantially with the drive frequency Fd, to adjust the speed of the light beam Lk and thereafter, to output the Ready signal to the CPU 101 to complete the start-up process for the black exposure unit 6K. Receiving the Ready signal, the CPU 101 performs a monochromatic print process according to the monochromatic print command.

As described above, the embodiment is adapted to adjust the resonant frequencies of the deflectors 65 (65Y, 65M, 65C, 65K) by controlling the resonant-frequency adjusting sections 653 for the respective toner colors by means of the frequency controllers 1023. Since the resonant frequencies Fry, Frm, Frc, Frk of the individual deflectors 65 are so adjusted as to be substantially in coincidence with the drive frequency Fd, all the deflectors 65 are driven into resonant oscillations at the predetermined frequency Fd and besides, in the maximum amplitude. This results in the formation of images of high quality.

According to this embodiment, the start-up process may be performed efficiently because when the print command indicates the monochromatic print, the adjustment of the deflector 65 is performed only on the black color which is required for the monochromatic printing. In some cases, the start-up process may be performed at power-on. In such a case, the deflector 65 may be subjected to the adjustment process similar to that performed for color printing.

Figure 12:
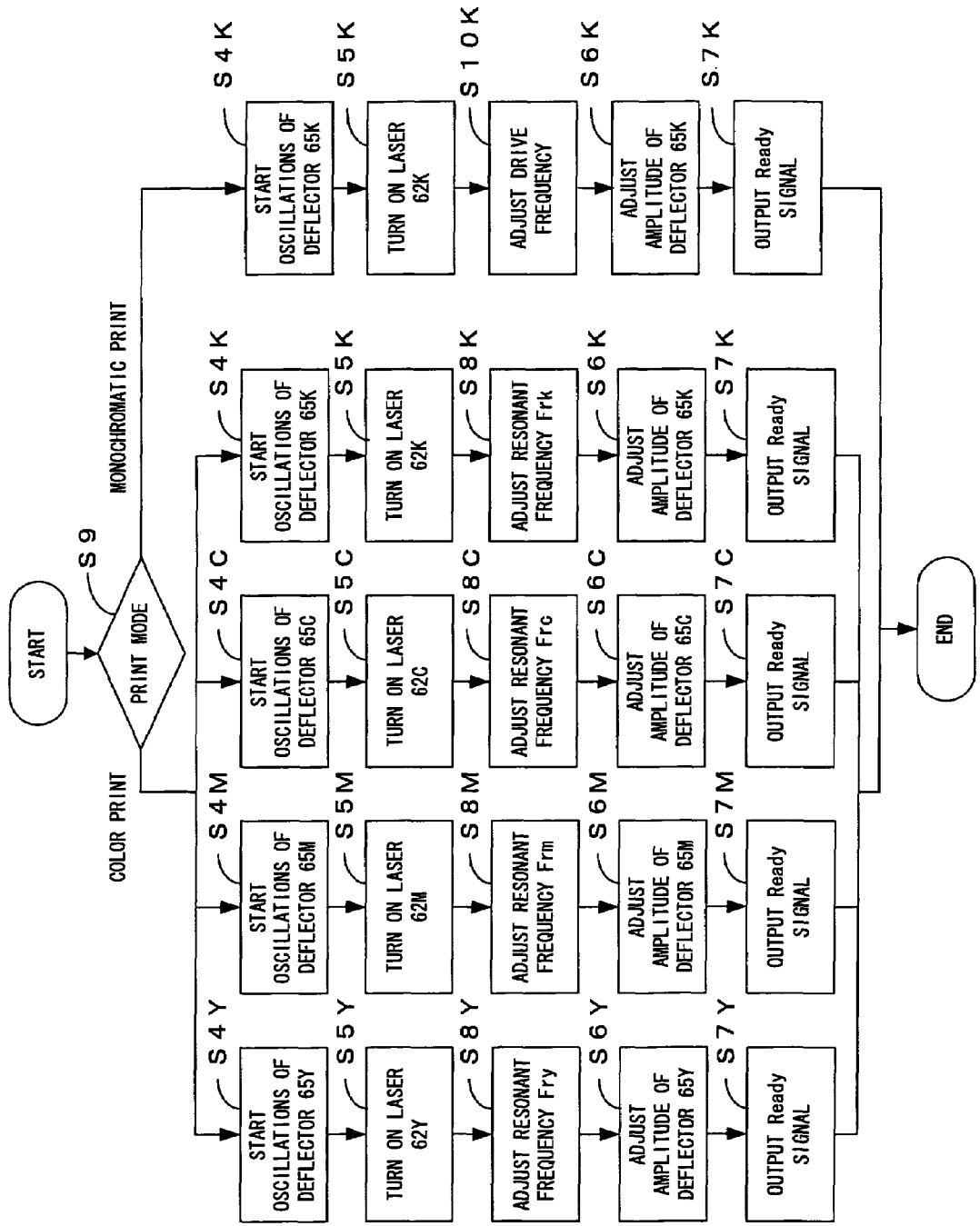
FIG. 12 is a flow chart showing another adjustment processes according to the third embodiment of the invention.

According to the above third embodiment, in a case where the print command indicates the monochromatic print, the adjustment may be made on the drive frequency, as shown in FIG. 12, in a manner that the drive frequency Fd is so varied as to coincide with the resonant frequency Frk of the deflector 65K. This is because the monochromatic print negates the need for superimposing the toner images on each other on the intermediate transfer belt 71 or for matching the amplitudes of the deflectors 65 for the individual colors with each other. Furthermore, some degree of variations of the drive frequency Fd impose a minor influence on the monochromatic image and are negligible in practical terms. What is more, adjusting the frequency Fd of the mirror drive signal is easier than adjusting the resonant frequency Frk via temperature control. The former adjustment is more excellent in response than the latter adjustment. However, in the case where the frequency Fd of the mirror drive signal is varied, a drive period of the deflector 65 is also varied. It is therefore preferred to vary the operating speeds of the individual parts of the apparatus according to the varied drive frequency Fd. By providing such controls, it is ensured that the monochromatic images are formed in a stable manner and also in high quality.

While the above embodiment subjects the deflector 65K to the adjustment even when the print command indicates the monochromatic print, an alternative arrangement may be made to omit the adjustment process when the monochromatic printing is performed. This is because the monochromatic print is less susceptible to the variations of the amplitude of the deflector 65 as compared with the color print.

While the above embodiment defines black as a "specific color" of the invention, it goes without saying that any other toner color may be defined as the "specific color".

Fourth Embodiment

Figure 13:
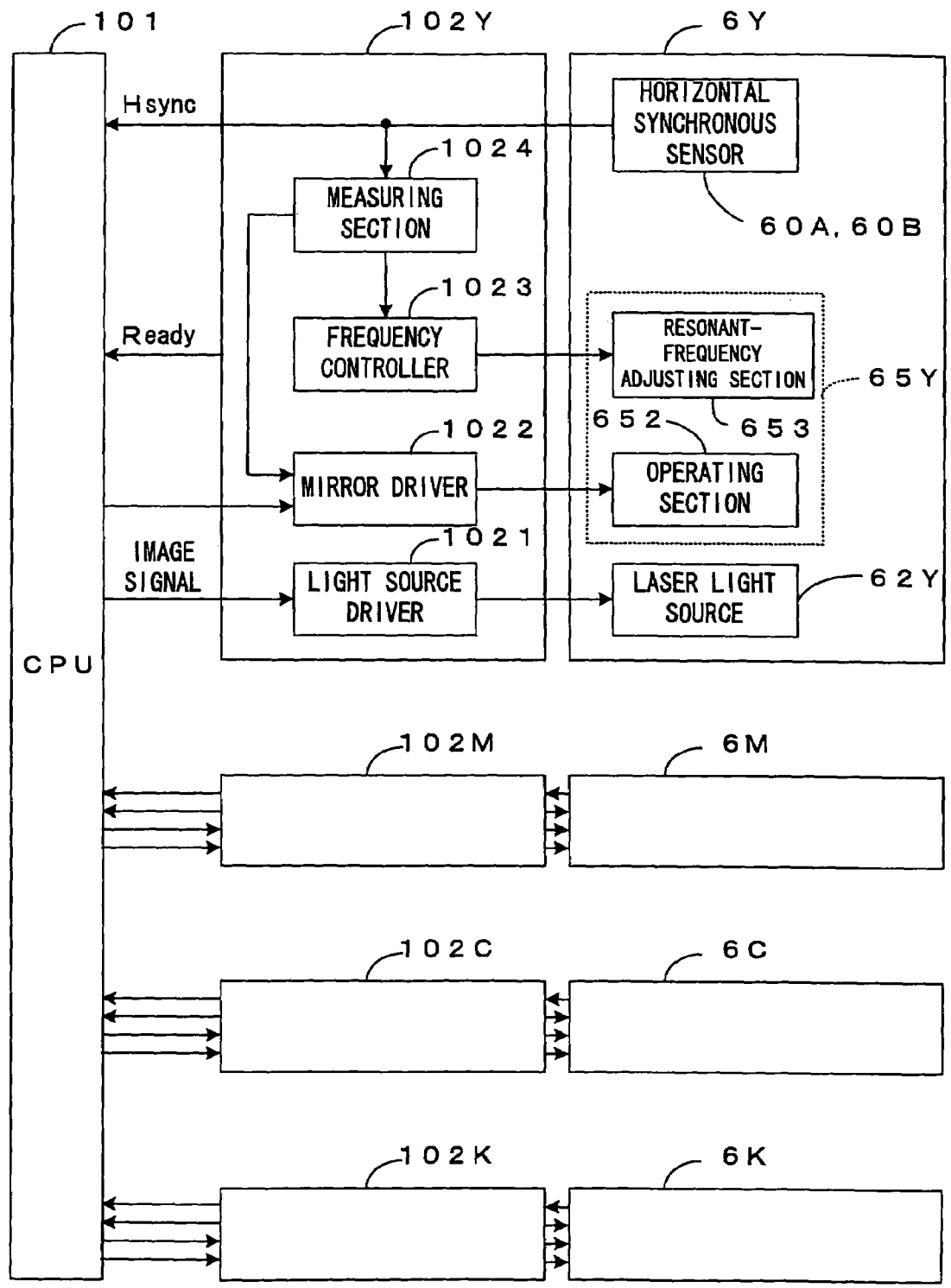
FIG. 13 is a block diagram showing an image forming apparatus according to the forth embodiment of the invention.
Figure 14:
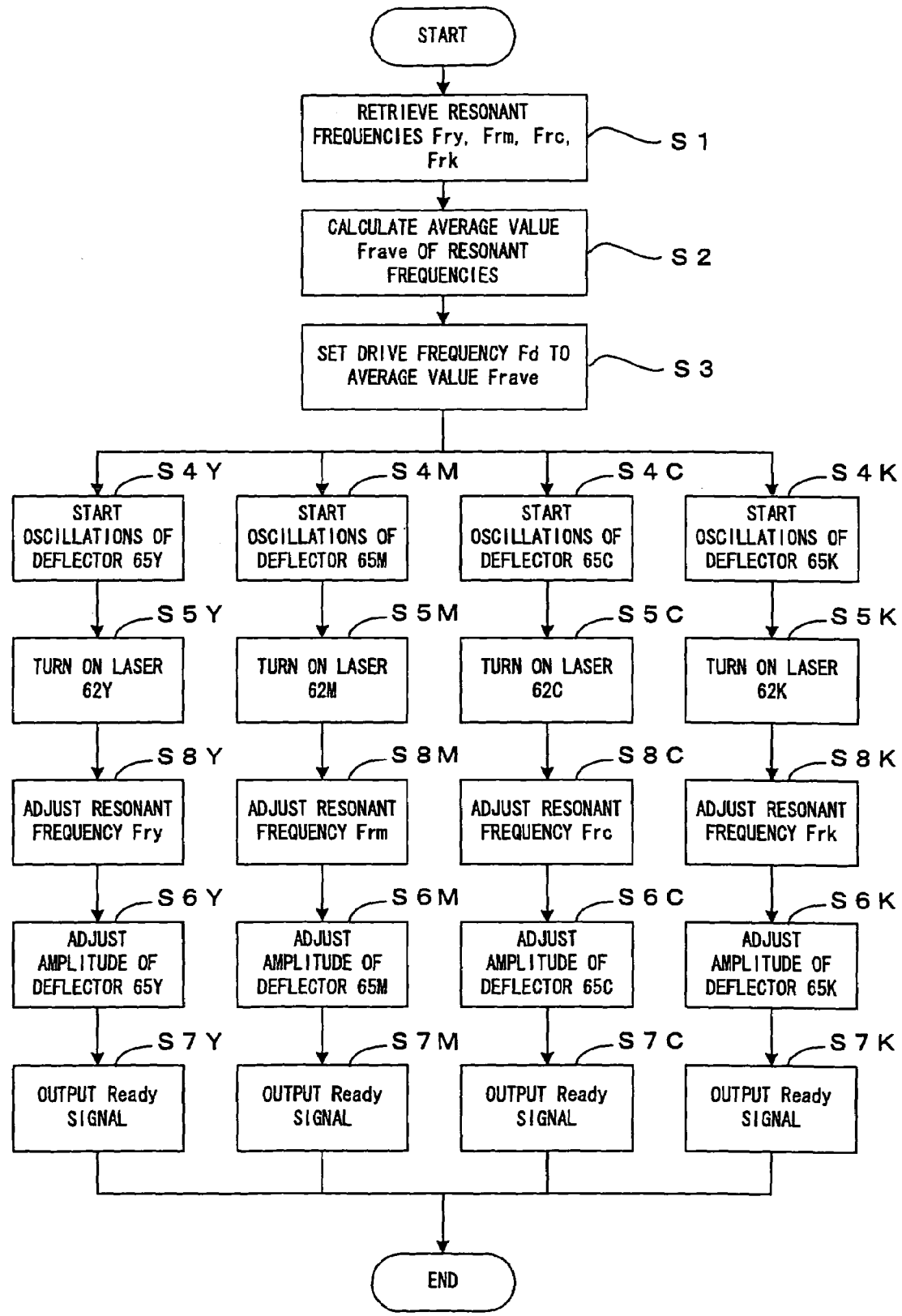
FIG. 14 is a flow chart showing a start-up process performed by the image forming apparatus of FIG. 13.
Figure 15:
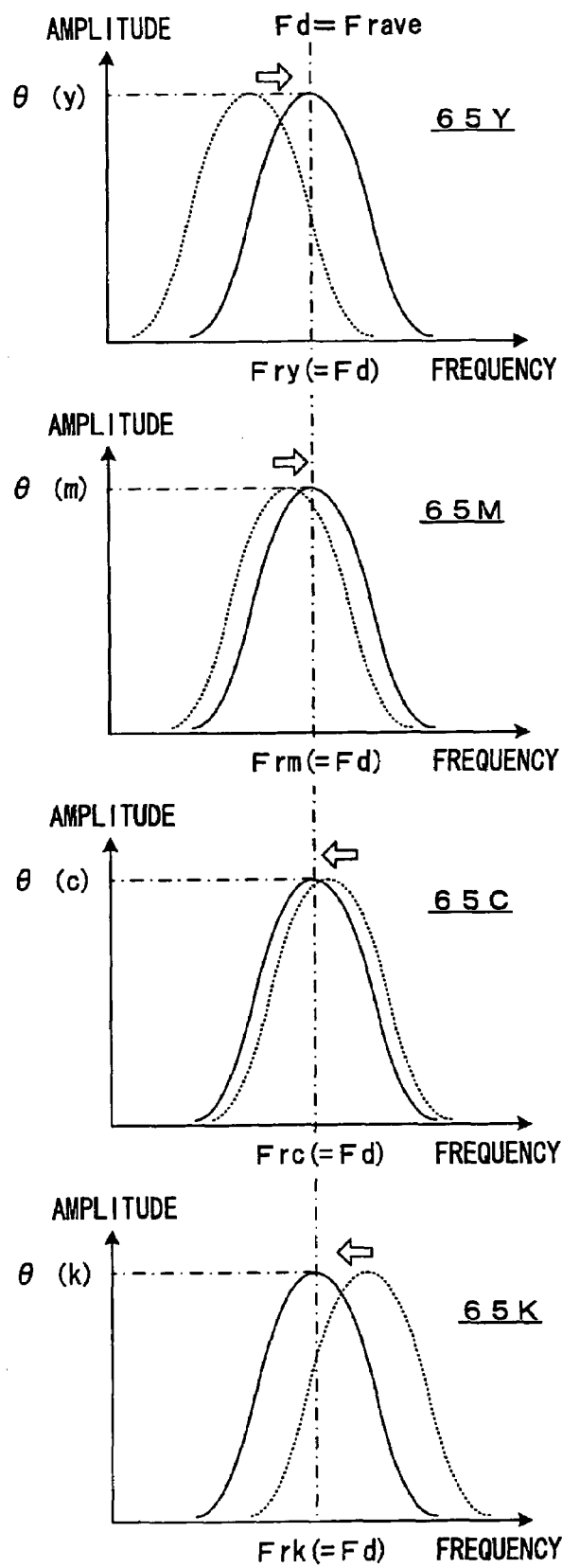
FIG. 15 is a group of diagrams schematically showing the start-up process of FIG. 14.

The above first and second embodiments cannot completely eliminate the deviation between the optimum value and the respective resonant frequencies although the drive frequency Fd is set to the optimum value. Hence, these embodiments may encounter a degree of limit in the adjustment of the deflector. On this account, an arrangement may be made such that, as suggested by the above third embodiment, the resonant frequencies of the exposure units 6 for the individual toner colors are so varied as to coincide substantially with the drive frequency Fd. Referring to FIG. 13 to FIG. 15, a fourth embodiment is described as below.

FIG. 13 is a block diagram showing an image forming apparatus according to the fourth embodiment of the invention. Similarly to the above third embodiment, the fourth embodiment includes the resonant-frequency adjusting sections 653 for the respective deflectors 6Y, 6M, 6C, 6K, and controls the resonant-frequency adjusting sections 653 via the respective frequency controllers 1023 for varying the respective resonant frequencies substantially to the drive frequency Fd. In this respect, the fourth embodiment significantly differs from the first embodiment. Therefore, the description on the fourth embodiment focuses on the difference from the first embodiment while like components are represented by the same reference characters, respectively, the description of which is dispensed with.

As shown in FIG. 13, the yellow exposure unit 6Y is provided with the resonant-frequency adjusting section 653 for varying the resonant frequency of the deflector 65Y. The resonant-frequency adjusting section 653 may adopt the arrangement disclosed in Japanese Unexamined Patent Publication No. 9-197334, for example. In this resonant-frequency adjusting section 653, the torsion spring (not shown) of the deflector 65 is formed with the electrical resistance element, which is electrically connected with the frequency controller 1023 of the exposure controller 102Y. The frequency controller 1023 controls the power supply to the electrical resistance element so as to vary the temperature of the torsion spring. Thus is varied the spring constant of the torsion spring so that the resonant frequency Fry of the deflector 65Y may be varied. On the other hand, the scan time calculated by the measuring section 1024 is transmitted to the frequency controller 1023, which in turn, controls the power supply to the resonant-frequency adjusting section 653 so as to vary the resonant frequency of the deflector 65Y for substantially matching the resonant frequency thereof with the drive frequency Fd. It is noted that a specific arrangement for varying the resonant frequency of the deflector 65Y is not limited to this, and any conventionally known arrangement may be adopted. The exposure units for the other toner colors are arranged the same way.

Next, a start-up process according to the fourth embodiment is described with reference to FIG. 14 and FIG. 15. FIG. 14 is a flow chart showing the start-up process performed by the image forming apparatus of FIG. 13. FIG. 15 is a group of diagrams schematically showing the start-up process of FIG. 14. The start-up process is performed as follows. Just as in the first embodiment, the CPU 101 calculates the average value Frave of the resonant frequencies Fry, Frm, Frc, Frk of the deflectors 65Y, 65M, 65C, 65K previously stored in the ROM 106 and causes the deflectors 65Y, 65M, 65C, 65K to oscillate with the drive frequency Fd set to the average value Frave. At this stage, it is difficult to match all the resonant frequencies Fry, Frm, Frc, Frk with the drive frequency Fd (=Frave), as indicated by broken lines in FIG. 15 for example. Hence, the adjustment process is performed on the deflectors 65 for all the toner colors.

First, a series of processings (Steps S4Y to S8Y) are performed on the yellow color, as shown in FIG. 14. That is, after the lapse of a predetermined period of time from the start of oscillations of the deflector 65Y, the light source driver 1021 outputs the light-source drive signal to the laser light source 62Y so as to turn on the laser light source 62Y (Step S5Y). In synchronism with the scanning of the light beam, the horizontal synchronous sensors 60A, 60B output the horizontal synchronous signal Hsync. In the subsequent Step S8Y, the frequency controller 1023 controls the power supply to the electric resistance element based on the sensor outputs so as to vary the temperature of the torsion spring of the deflector 65Y, whereby the (pre-adjustment) resonant characteristic of the deflector 65Y, as indicated by a broken line in the uppermost diagram of FIG. 15, is shifted to the drive frequency side. This brings the resonant frequency Fry of the deflector 65Y substantially into coincidence with the drive frequency Fd, as indicated by a solid line in the diagram. Consequently, the amplitude θ(y) is at the maximum value.

Next, after the adjustment of the resonant frequency Fry, the drive voltage of the mirror drive signal applied from the mirror driver 1022 to the deflector 65 is controlled based on the sensor outputs so as to adjust the maximum amplitude value of the deflector 65Y, whereby the speed of the light beam Ly is adjusted (Step S6Y). This ensures that the light beam Ly is scanned stably. When the stabilization of the scan speed is completed, the laser light source 62 is turned off. In step S7Y, the exposure controller outputs the Ready signal to the CPU 101 to complete the start-up process for the yellow exposure unit 6Y.

The same processes as the above are performed on the other toner colors than yellow. That is, a series of processings (Steps S4M to S8M) are performed on the magenta color to match the resonant frequency Frm of the deflector 65M substantially with the drive frequency Fd, to adjust the scan speed of the light beam Lm and thereafter, to output the Ready signal to the CPU 101 to complete the start-up process for the magenta exposure unit 6M. Further, a series of processings (Steps S4C to S8C) are performed on the cyan color to match the resonant frequency Frc of the deflector 65C substantially with the drive frequency Fd, to adjust the scan speed of the light beam Lc, and thereafter, to output the Ready signal to the CPU 101 to complete the start-up process for the cyan exposure unit 6C. Furthermore, a series of processings (Steps S4K to S8K) are performed on the black color to match the resonant frequency Frk of the deflector 65K substantially with the drive frequency Fd, to adjust the scan speed of the light beam Lk and thereafter, to output the Ready signal to the CPU 101 to complete the start-up process for the black exposure unit 6k.

As described above, the fourth embodiment is adapted to set the drive frequency Fd to the optimum value. In addition, the embodiment controls the resonant-frequency adjusting sections 653 for the respective toner colors by means of the frequency controllers 1023, thereby adjusting the resonant frequencies Fry, Frm, Frc, Frk of the individual deflectors 65 in a manner to match the resonant frequencies Fry, Frm, Frc, Frk substantially with the optimum drive frequency Fd. Therefore, all the deflectors 65 are driven into resonant oscillations at the predetermined frequency Fd and besides, in the maximum amplitude. This results in the formation of images of high quality.

<Other Features>

It is to be noted that the invention is not limited to the foregoing embodiments and various modifications other than the above may be made thereto so long as such modifications do not depart from the scope of the invention. Although the third and fourth embodiments, for example, adjust the resonant frequencies Fry, Frm, Frc, Frk of the deflectors 65 (65Y, 65M, 65C, 65K) based on the horizontal synchronous signal Hsync from the horizontal synchronous sensors 60A, 60B, the information usable for the adjustment of the resonant frequency is not limited to the horizontal synchronous signal Hsync but any information related to the resonant frequency may be used. For instance, a displacement detection sensor such as disclosed in Japanese Unexamined Patent Publication No. 7-218857 may be provided at the deflector 65 for detecting the amount of displacement of the deflective mirror 651, while the resonant frequency Fry, Frm, Frc, Frk of the deflector 65 may be adjusted based on the detection value.

While the above third and fourth embodiments employ the resonant-frequency adjusting section 653 which utilizes the variations of the spring constant associated with temperature variations, the arrangement of the resonant-frequency adjusting section 653 is not limited to this. The resonant frequency may be adjusted by the conventionally known methods.

In the foregoing embodiments, the deflector 65 formed using the micromachining technique is employed as the oscillation mirror. The invention is applicable to all kinds of image forming apparatuses which use the oscillation mirror adapted for resonant oscillations for deflecting the light beam thereby scanning the light beam on the latent image carrier.

Although the invention has been described with reference to specific embodiments, this description is not meant to be construed in a limiting sense. Various modifications of the disclosed embodiment, as well as other embodiments of the present invention, will become apparent to persons skilled in the art upon reference to the description of the invention. It is therefore contemplated that the appended claims will cover any such modifications or embodiments as fall within the true scope of the invention.

What is claimed is:

1. An image forming apparatus comprising:
a plurality of latent image carriers;
a plurality of exposure units each provided in correspondence to the respective latent image carriers, each of the exposure units including a light source and a oscillation mirror, and forming a latent image on the latent image carrier by deflecting a light beam from the light source into a deflected light beam by means of the oscillation mirror in oscillations and scanning the deflected light beam on the latent image carrier;
a drive unit which applies a drive signal having a predetermined drive frequency to each oscillation mirror to drive the oscillation mirror;
an adjusting unit which adjusts resonant frequencies of the oscillation mirrors, respectively;
a controller which controls the adjusting unit in a manner to match all the resonant frequencies of the oscillation mirrors substantially with the drive frequency; and
a plurality of developing units, each provided in correspondence to the respective plurality of latent image carriers, forming a plurality of different color toner images by developing the latent images with different color toners, respectively,
wherein a color printing operation or a monochromatic printing operation is selectively performed, the color printing operation being of forming a color image by forming the different color toner images by means of the developing units and superimposing the different color toner images on each other on a transfer medium, the monochromatic printing operation being of forming a monochromatic image by forming a toner image by means of one of the developing units for a specific color of the plurality of colors and transferring the toner image to a transfer medium,
wherein the drive unit is configured to vary the drive frequency of the drive signal,
wherein the controller controls the adjusting unit in the execution of the color printing operation in a manner to match all the resonant frequencies of the oscillation mirrors substantially with the drive frequency, or controls the drive unit in the execution of the monochromatic printing operation in a manner to match the drive frequency of the drive signal substantially with the resonant frequency of an oscillation mirror corresponding to the specific color, and
wherein when the color printing operation is executed, the controller performs an adjustment process to match all the resonant frequencies of the oscillation mirrors substantially with the drive frequency prior to the color printing operation, or when the monochromatic printing operation is executed, the controller does not perform the adjustment process.

2. An image forming apparatus according to claim 1, wherein in a case where the drive frequency of the drive signal is varied in order to execute the monochromatic printing operation, the controller varies operating speeds of individual parts of the apparatus according to varying the drive frequency.

3. An image forming apparatus according to claim 1, wherein the drive unit comprises a plurality of drivers each provided in correspondence to the respective oscillation mirrors, each of the drivers applying the drive signal to the oscillation mirror to drive the oscillation mirror.

4. An image forming apparatus according to claim 3, further comprising a plurality of amplitude detectors each provided in correspondence to the respective oscillation mirrors and detecting an amplitude of the oscillation mirror,
  wherein the drivers adjust amplitudes of the oscillation mirrors based on outputs of the amplitude detectors, respectively.

5. An image forming apparatus comprising:
  a plurality of latent image carriers;
  a plurality of exposure units each provided in correspondence to the respective latent image carriers, each of the exposure units including a light source and a oscillation mirror, and forming a latent image on the latent image carrier by deflecting a light beam from the light source into a deflected light beam by means of the oscillation mirror in oscillations and scanning the deflected light beam on the latent image carrier;
  a drive unit which applies a drive signal having a predetermined drive frequency to each oscillation mirror to drive the oscillation mirror;
  an adjusting unit which adjusts resonant frequencies, of the oscillation mirrors, respectively;
  a controller which controls the adjusting unit in a manner to match all the resonant frequencies of the oscillation mirrors substantially with the drive frequency; and
  a plurality of developing units, each provided in correspondence to the respective plurality of latent image carriers, forming a plurality of different color toner images by developing the latent images with different color toners, respectively,
  wherein a color printing operation or monochromatic printing operation is selectively performed, the color printing operation being of forming a color image by forming the different color toner images by means of the developing units and superimposing the different color toner images on each other on a transfer medium, the monochromatic printing operation being of forming a monochromatic image by forming a toner image by means of one of the developing units for a specific color of the plurality of colors and transferring the toner image to a transfer medium,
  wherein when the color printing operation is executed, the controller performs an adjustment process to match all the resonant frequencies of the oscillation mirrors substantially with the drive frequency prior to the color printing operation, or when the monochromatic printing operation is executed, the controller does not perform the adjustment process.

6. An image forming apparatus according to claim 5, wherein the drive unit comprises a plurality of drivers each provided in correspondence to the respective oscillation mirrors, each of the drivers applying the drive signal to the oscillation mirror to drive the oscillation mirror.

7. An image forming apparatus according to claim 6, further comprising a plurality of amplitude detectors each provided in correspondence to the respective oscillation mirrors and detecting an amplitude of the oscillation mirror,
  wherein the drivers adjust amplitudes of the oscillation mirrors based on outputs of the amplitude detectors, respectively.

8. An image forming method comprising:
  a preparing step of preparing a plurality of latent image carriers each formed with latent image on its surface;
  a latent image forming step of deflecting a light beam from a light source by means of an oscillation mirror oscillating at a predetermined drive frequency and scanning the deflected light beam on each latent image carrier;
  a developing step of developing the latent images with different color toners to form a plurality of different color toner images; and
  a transferring step of forming a color image by superimposing the different color toner images on a transfer medium, or of forming a monochromatic image by transferring a toner image of a specific color of the plurality of colors to the transfer medium,
  wherein, prior to the latent image forming step, when the color image is formed, an adjustment step is performed to match all the resonant frequencies of the oscillation mirrors substantially with the drive frequency or, when the monochromatic image is formed, the adjustment step is not performed.

* * * * *